United States Patent
Kim et al.

(10) Patent No.: US 10,814,219 B2
(45) Date of Patent: Oct. 27, 2020

(54) METHOD OF DISPLAYING GRAPHIC OBJECT DIFFERENTLY ACCORDING TO BODY PORTION IN CONTACT WITH CONTROLLER, AND ELECTRONIC DEVICE

(71) Applicant: Samsung Electronics Co., Ltd, Suwon-si (KR)

(72) Inventors: Jongyoon Kim, Suwon-si (KR); Yongjin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/287,811

(22) Filed: Feb. 27, 2019

(65) Prior Publication Data

US 2019/0262697 A1    Aug. 29, 2019

(30) Foreign Application Priority Data

Feb. 27, 2018    (KR) ........................ 10-2018-0023533

(51) Int. Cl.
| | |
|---|---|
| *A63F 13/00* | (2014.01) |
| *A63F 13/21* | (2014.01) |
| *G06T 7/73* | (2017.01) |
| *G06F 3/0346* | (2013.01) |
| *G06T 19/20* | (2011.01) |

(52) U.S. Cl.
CPC ............ *A63F 13/21* (2014.09); *G06F 3/0346* (2013.01); *G06T 7/73* (2017.01); *G06T 19/20* (2013.01)

(58) Field of Classification Search
None
See application file for complete search history.

(56) References Cited

U.S. PATENT DOCUMENTS

2007/0080931 A1   4/2007 Chen et al.
2010/0225566 A1*  9/2010 Sato ..................... G02B 27/017
                                                              345/8
(Continued)

FOREIGN PATENT DOCUMENTS

KR    10-2011-0080914 A    7/2011

OTHER PUBLICATIONS

International Search Report dated May 9, 2019 in connection with International Patent Application No. PCT/KR2019/001065, 4 pages.

(Continued)

*Primary Examiner* — Paul A D'Agostino

(57) ABSTRACT

An electronic device includes a display, a communication circuitry, and a processor, wherein the processor is configured to acquire, through the communication circuitry, a first control signal from a controller in contact with a first body portion, the first control signal including information indicating that the controller is in contact with the first body portion. The processor is further configured to display, based on the first control signal, a first graphic object corresponding to the first body portion through the display, and to acquire, through the communication circuitry, a second control signal from the controller, which is in contact with a second body portion. The second control signal includes information indicating that the controller is in with the second body portion. The processor is further configured to display, based on the second control signal, a second graphic object corresponding to the second body portion through the display.

20 Claims, 14 Drawing Sheets

(56) References Cited

U.S. PATENT DOCUMENTS

| | | | |
|---|---|---|---|
| 2014/0018819 A1* | 1/2014 | Raj | A61B 34/70 606/130 |
| 2014/0089849 A1* | 3/2014 | Choi | G06F 3/04842 715/810 |
| 2014/0364212 A1* | 12/2014 | Osman | A63F 13/213 463/31 |
| 2015/0352437 A1* | 12/2015 | Koseki | G06F 3/011 463/31 |
| 2015/0379892 A1* | 12/2015 | Sako | G06F 19/3475 434/127 |
| 2015/0381885 A1* | 12/2015 | Kim | G06F 3/011 348/207.1 |
| 2016/0140764 A1* | 5/2016 | Bickerstaff | G02B 27/017 345/633 |
| 2016/0357249 A1 | 12/2016 | Webb et al. | |
| 2017/0329440 A1* | 11/2017 | Sturm | G06F 3/011 |
| 2018/0001188 A1* | 1/2018 | Patel | A63F 13/428 |

OTHER PUBLICATIONS

Written Opinion of the International Searching Authority dated May 9, 2019 in connection with International Patent Application No. PCT/KR2019/001065, 7 pages.

* cited by examiner

METHOD OF DISPLAYING GRAPHIC OBJECT DIFFERENTLY ACCORDING TO BODY PORTION IN CONTACT WITH CONTROLLER, AND ELECTRONIC DEVICE

CROSS-REFERENCE TO RELATED APPLICATION

This application is based on and claims priority under 35 U.S.C. § 119 to Korean Patent Application No. 10-2018-0023533 filed on Feb. 27, 2018 in the Korean Intellectual Property Office, the disclosure of which is incorporated by reference herein in its entirety.

BACKGROUND

1. Field

Various embodiments relate to an electronic device that controls display of a graphic object corresponding to a controller at least partially on the basis of a body portion with which the controller contacts with in the electronic device, as well as to a method of controlling display of an object in the electronic device.

2. Description of Related Art

A head mount display device is mounted on a user's head and displays a stereoscopic image by implementing a visual virtual reality through the display of the device.

A separate controller can be used for a method for displaying a stereoscopic image by implementing a visual virtual reality in the head mount display device; and in the head mount display device, a virtual object corresponding to a controller capable of detecting the operation of a user may be displayed through the display of the device.

A controller that is gripped by a user and that is changed according to the movement of the user may transmit movement information to the head mount display device, and the head mount display device may change and display the virtual object to correspond to the movement of the controller through the display of the device.

SUMMARY

When a controller according to various embodiments of this disclosure is used, the controller is divided into a left-hand mode and a right-hand mode so that the controller can be used to suit the user's left or right-handedness.

In order to display the object corresponding to the controller on the head mount display device, the user needs to set in advance whether to display the object as a left-hand mode object or a right-hand mode object through a plurality of selection steps.

According to various embodiments, an electronic device may comprise: a display; a communication circuitry; and a processor, wherein the processor is configured to acquire, through the communication circuitry, a first control signal from a controller contacting with a first body portion, the first control signal including information indicating that the controller contacts with the first body portion; display a first graphic object corresponding to the first body portion through the display, at least partially on the basis of the first control signal; to acquire, through the communication circuitry, a second control signal from the controller contacting with a second body portion, the second control signal including information indicating that the controller contacts with the second body portion; and to display a second graphic object corresponding to the second body portion through the display, at least partially on the basis of the second control signal.

According to various embodiments, a method of controlling objects displayed in an electronic device may comprise: acquiring, through a communication circuitry included in the electronic device, a first control signal including information indicating that a controller contacts with a first body portion from the controller that contacts with the first body portion; displaying, through a display, a first graphic object corresponding to the first body portion and a third graphic object corresponding to the controller associated with the first graphic object at least partially on the basis of the first control signal; acquiring, through the communication circuitry, a second control signal including information indicating that the controller contacts with a second body portion from the controller that contacts with the second body portion; and displaying, through the display, a second graphic object corresponding to the second body portion and the third graphic object in association with the second graphic object at least partially on the basis of the second control signal.

According to various embodiments, an electronic device may include: a sensor unit; a communication circuitry; and a processor, wherein the processor is configured to acquire a first control signal from the sensor unit on the basis of the electronic device that contacts with a first body portion; to transmit the first control signal to another electronic device through the communication circuitry so that the other electronic device displays a first graphic object corresponding to the first body portion on the basis of the first control signal; to acquire a second control signal from the sensor unit on the basis of the electronic device that contacts with a second body portion; and to transmit the second control signal to the other electronic device through the communication circuitry so that the other electronic device displays a second graphic object corresponding to the second body portion on the basis of the second control signal.

In various embodiments, an object corresponding to a controller may be displayed according to the gripping state of a user with respect to the controller, so that left/right switching of the object corresponding to the controller may be naturally displayed and may minimize the inconvenience caused by the left/right switching operation of the controller, thereby maintaining user experience without hindering the immersion of virtual reality in an electronic device (e.g., a head mount display device).

In terms of controller manufacturing, an object corresponding to a controller suitable for left-handed/right-handed gripping of a user may be output so that the same type of controllers can be manufactured without necessitating the separate manufacture of left and right-hand controllers.

The left/right switching may be performed naturally according to the gripping state of a user, such that it is possible to more freely produce Virtual Reality (VR) content without restrictions on the production of a separate scenario according to the left/right switching even when the VR content is produced, and so that even existing content produced on the basis of the existence of both hands can be played with only one controller.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
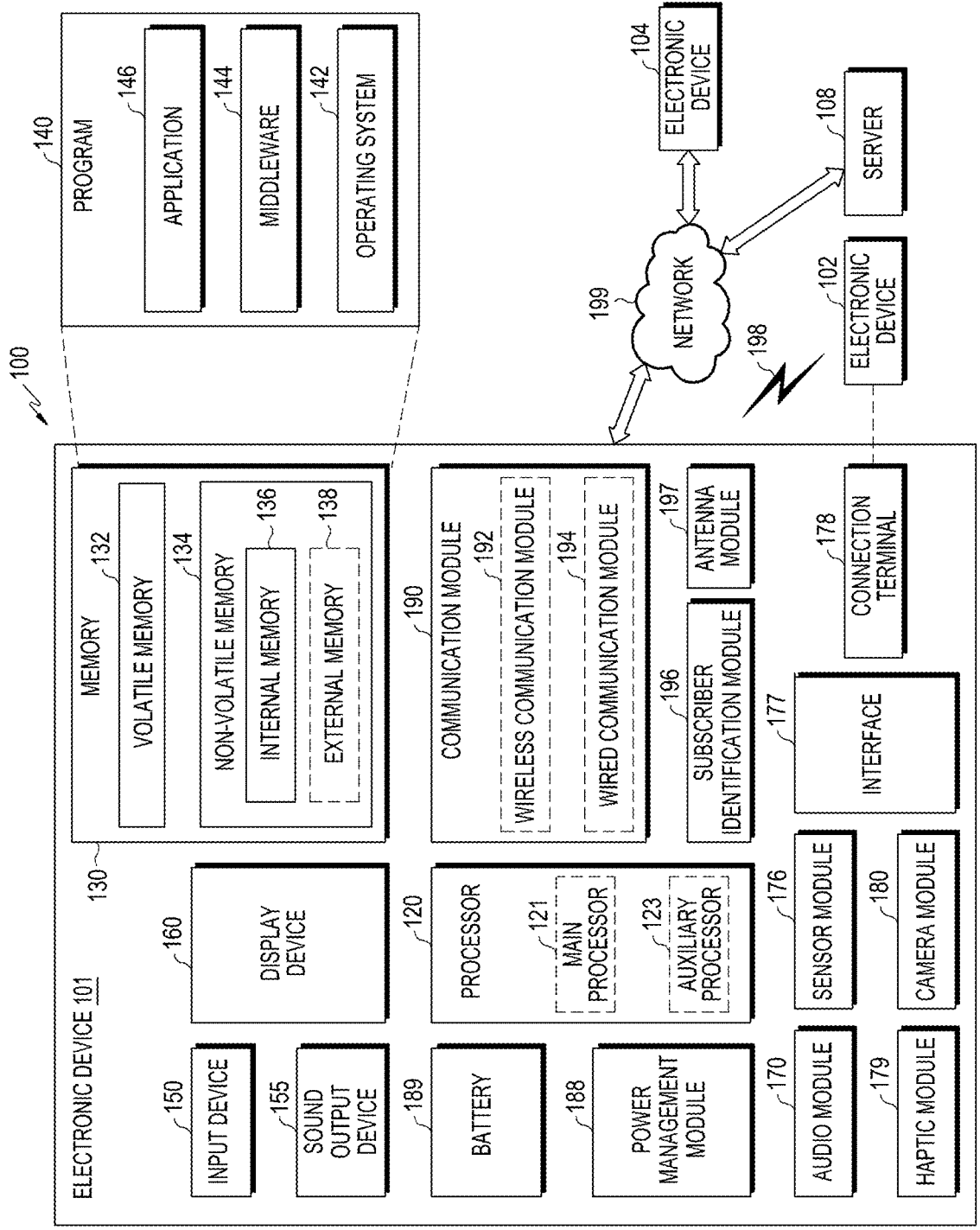
FIG. 1 illustrates, in block diagram format, an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
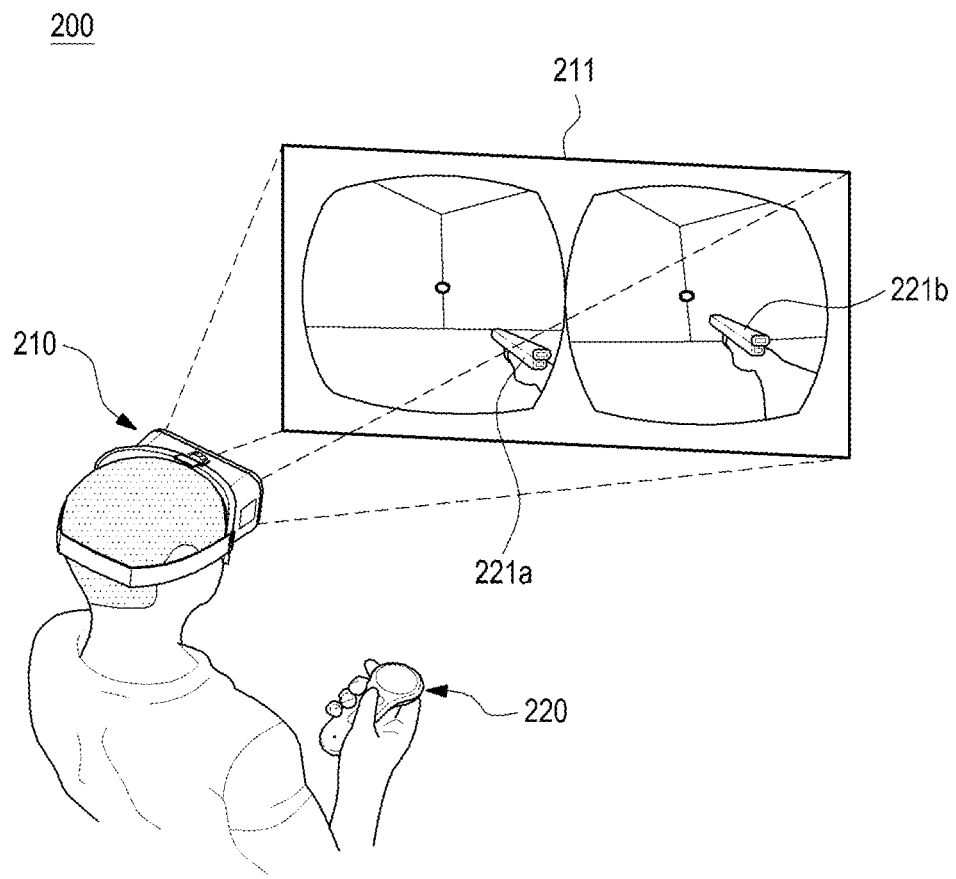
FIG. 2 illustrates aspects of an object display control system 200 according to various embodiments.

FIG. 2 illustrates aspects of an object display control system 200 according to various embodiments. Referring to the non-limiting example of FIG. 2, the object display control system 200 may include an electronic device 210 (e.g., the electronic device 101 of FIG. 1) and a controller 220 (e.g., the electronic device 102 of FIG. 1).

The electronic device 210 may display a graphic object 221*a* or 221*b* corresponding to the controller 220 so as to correspond to a specific body portion through a display 211 at least partially on the basis of a signal (e.g., a control signal) received from the controller 220 that contacts with the specific body portion. The signal (e.g., the control signal), according to various embodiments, may include sensor data acquired from a sensor module (e.g., a sensor unit 476 of FIG. 4) of the controller 220.

According to some embodiments, the electronic device 210 may include a head mount display device that can be worn on a user's head.

According to certain embodiments, the electronic device 210 may display the graphic object 221*a* or 221*b* corresponding to the controller 220 so as to correspond to a first body portion (e.g., a left hand) through the display 211 at least partially on the basis of a first control signal received from the controller 220 that contacts with the first body portion (e.g., the left hand).

According to various embodiments, the electronic device 210 may display the graphic object 221*a* or 221*b* corresponding to the controller 220 so as to correspond to a second body portion (e.g., a right hand) through the display 211 at least partially on the basis of a second control signal received from the controller 220 that contacts with the second body portion (e.g., the right hand).

The controller 220 may detect the specific contacted body portion, and may transmit a control signal obtained at least partially on the basis of the specific detected body portion to the electronic device 210.

According to some embodiments, the controller 220 may use the sensor unit to detect a specific body portion with which the controller 220 contacts.

Figure 3:
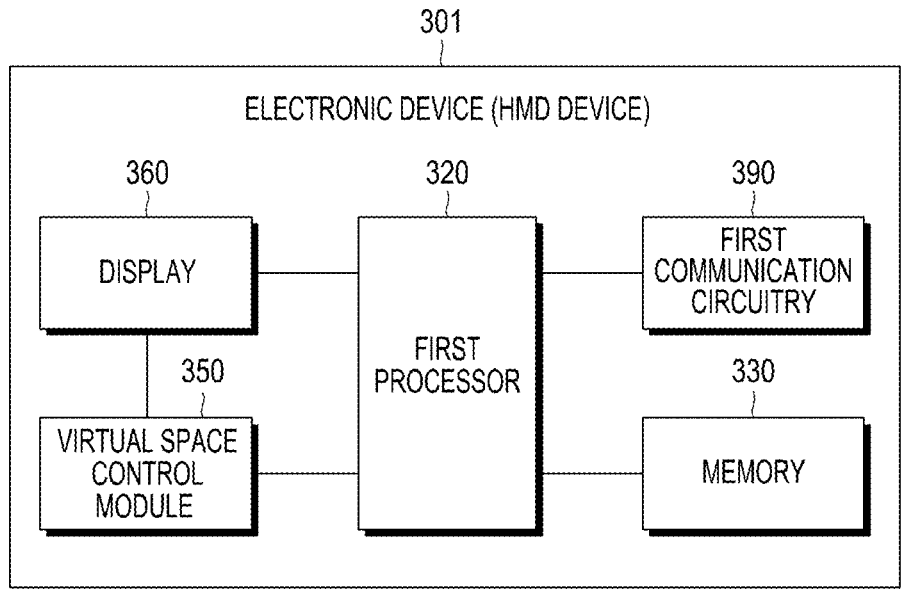
FIG. 3 illustrates, in block diagram format, an electronic device according to various embodiments.

FIG. 3 illustrates, in block diagram format, an electronic device 301 (e.g., the electronic device 101, 102, or 104 of FIG. 1 or the electronic device 210 of FIG. 2) according to various embodiments.

Referring to the non-limiting example of FIG. 3, the electronic device 301 may include a first processor 320, a memory 330, a virtual space control module 350, a display 360, and a first communication circuitry 390.

According to certain embodiments, first processor 320 may identify a specific body portion with which a controller (e.g., controller 220 of FIG. 2) contacts at least partially on the basis of a control signal received the controller that contacts with the specific body portion (e.g., a left hand or a right hand), and may display a graphic object corresponding to the specific body portion through a display 360 (e.g., the display 160 of FIG. 1 or the display 211 of FIG. 2).

According to certain embodiments, when a first control signal is received from a controller (e.g., controller 220 of FIG. 2) that contacts with a first body portion (e.g., a left hand) through the first communication circuitry 390, the first processor 320 may display a first graphic object corresponding to the first body portion through the display 360, at least partially on the basis of a first control signal, and the first graphic object may be an object indicating the controller (e.g., the controller 220 of FIG. 2).

According to various embodiments, the first control signal may include information (e.g., grip pattern information on the basis of sensor data) indicating the first body portion that contacts with the controller (e.g., the controller 220 of FIG. 2).

According to some embodiments, when a second control signal is received through the first communication circuitry 390 from the controller with which a second body portion (e.g., a right hand) contacts, the first processor 320 may display a second graphic object to correspond to the position of the second body portion through the display 360, at least partially on the basis of the second control signal, and the second graphic object may be an object indicating the controller.

According to certain embodiments, the second control signal may include information (e.g., grip pattern information) indicating the second body portion that contacts with the controller (e.g., controller 220 of FIG. 2).

According to various embodiments, when a signal indicating that power is turned on is received from the controller (e.g., controller 220 of FIG. 2) through the first communication circuitry 390, the first processor 320 may display a graphic object corresponding to the controller at a central position of the display 360. When the first control signal is received from the controller through the first communication circuitry 390, the first processor 320 may detect position information of the controller that contacts with the first body portion (e.g., the left hand) on the basis of the first control signal. The first processor 320 may change the graphic object corresponding to the controller to the first graphic object that corresponds to the position of the first body portion (e.g., the left hand) and that is associated with the graphic object, on the basis of the position information of the controller that contacts with the first body portion (e.g., the left hand). When the second control signal is received from the controller through the first communication circuitry 390, the first processor 320 may detect position information of the controller that contacts with the second body portion (e.g., the right hand) on the basis of the second control signal. The first processor 320 may change the graphic object corresponding to the controller to the second graphic object that corresponds to the position of the second body portion (e.g., the right hand) and that is associated with the graphic object, on the basis of the position information of the controller that contacts with the second body portion (e.g., the right hand).

According to some embodiments, before the signal indicating that power is turned on is received from the controller (e.g., controller 220 of FIG. 2), the first processor 320 may not display the graphic object corresponding to the controller on the display 360, may display a specific graphic object indicating the state before the controller is activated, or may change the displayed degree of transparency of the graphic object corresponding to the controller.

According to certain embodiments, the first graphic object displayed according to the first control signal may be a graphic object for a first body portion mode (e.g., a left hand mode), and may include a graphic object indicating the shape of the controller that can be displayed when the controller (e.g., controller 220 of FIG. 2) is contacts with the first body portion (e.g., the left hand). The second graphic object displayed according to the second control signal may be a graphic object for a second body portion mode (e.g., a right hand mode), and may include a graphic object indicating the shape of the controller that can be displayed when the controller (e.g., controller 220 of FIG. 2) contacts with the second body portion (e.g., the right hand).

For example, when a first control signal indicating that a user grips the controller with his/her left hand is received while a "gun", which is a graphic object corresponding to the controller (e.g., controller 220 of FIG. 2), is displayed at the central position of the display 360 of the electronic device 301, the first processor 320 may display the "gun" that is the graphic object located in at least a partial region (e.g., a central region of a display region, hereinafter, referred to as a central region of the display) of the display, as a "gun" that is a first graphic object whose position is changed to a position when the user grips the "gun", which is the graphic object, with his/her left hand. In addition, when a second control signal indicating that a user grips the controller with his/her right hand is received while a "gun", which is a graphic object corresponding to the controller, (e.g., controller 220 of FIG. 2) is displayed at the central position of the display 360 of the electronic device 301, the first processor 320 may display the "gun" that is the graphic object located at the central region of the display, as a "gun" that is a second graphic object whose position is changed to a position when the user grips the "gun", which is the graphic object, with his/her right hand. In addition, when the second control signal indicating that the user grips the controller with his/her right hand is received while the "gun", which is the first graphic object through the display 360 of the electronic device 301, the first processor 320 may display the "gun" that is the graphic object located in the central region of the display, as the "gun" that is the second graphic object whose position is changed to the position when the user grips the "gun", which is the graphic object, with his/her right hand.

According to various embodiments, the first processor 320 may acquire a third control signal including information indicating that the controller is contacts with the first body portion and second body portion, from the controller that contacts with the first body portion (e.g., the left hand) and the second body portion (e.g., the right hand) through the first communication circuitry 390. The first processor 320 may display a third graphic object corresponding to the position of the first body portion and the position of the second body portion through the display 360, at least partially on the basis of the third control signal. For example, when both hands (e.g., the first body portion {e.g., the left hand} and the second body portion {e.g., the right hand}) contact with one controller, the first processor 320 may receive a third control signal including information indicating that both hands contact with the controller, from the controller with which both hands contact, and may display a third graphic object corresponding to the controller with which both hands contact, through the display 360.

According to some embodiments, when switching from a first mode for displaying a first graphic object corresponding to the position of the first body portion (e.g., the left hand) through the display 360, according to the reception of the first control signal, to a second mode for displaying a second graphic object corresponding to the position of the second body portion (e.g., the right hand), according to the reception of the second control signal, the first processor 320 may smoothly express the transformation of the object by displaying an animation or the like during the transition from the first mode to the second mode.

The first processor 320 may receive a control signal including the position of a specific body portion (e.g., a left hand or a right hand) and movement information of the controller (e.g., controller 220 of FIG. 2) from the controller (e.g., controller 220 of FIG. 2) that contacts with the specific body portion, may identify the specific body portion with which the controller contacts and the movement information of the controller on the basis of the control signal, and may change a graphic object corresponding to the specific body portion on the basis of the movement information of the controller in order to display the changed graphic object through the display 360 (e.g., the display 160 of FIG. 1 and the display 211 of FIG. 2).

According to certain embodiments, when a first control signal is received from the controller (e.g., controller 220 of FIG. 2), the first processor 320 may change a graphic object corresponding to the controller to a first graphic object that corresponds to the position of the first body portion (e.g., the left hand) and that is associated with the graphic object on the basis of the first control signal, and may change and display the first graphic object on the basis of the movement information of the controller.

According to various embodiments, the first control signal may include information (e.g., grip pattern information and movement/rotation information of the controller) indicating the first body portion with which the controller contacts.

According to some embodiments, when a second control signal is received from the controller (e.g., controller 220 of FIG. 2), the first processor 320 may change a graphic object corresponding to the controller into a second graphic object that corresponds to the position of the second body portion (e.g., the right hand) and that is associated with the graphic object on the basis of the second control signal, and may change and display the second graphic object on the basis of the movement information of the controller.

According to certain embodiments, the second control signal may include information (e.g., grip pattern information and movement/rotation information of the controller) indicating the second body portion with which the controller contacts.

The first processor 320 may identify the position and size of the specific body portion (e.g., the left hand or the right hand) with which the controller contacts, at least partially on the basis of the control signal received from the controller (e.g., controller 220 of FIG. 2) that contacts with the specific body portion, and may display a graphic object corresponding to the position of the specific body portion and a body graphic object (e.g., a hand) corresponding to the size of the specific body portion through the display 360 (e.g., the display 160 of FIG. 1 and the display 211 of FIG. 2).

According to various embodiments, when a first control signal is received through the first communication circuitry 390 from the controller (e.g., controller 220 of FIG. 2) that contacts with the first body portion (e.g., the left hand), the first processor 320 may identify a first graphic object corresponding to the position of the first body portion (e.g., the left hand) at least partially on the basis of the first control signal, may identify a first body graphic object corresponding to the size of the first body portion (e.g., the left hand), and may display the first graphic object gripped by the first body graphic object through the display 360.

According to some embodiments, the first control signal may include information (e.g., grip pattern information) indicating the first body portion with which the controller (e.g., controller 220 of FIG. 2) contacts and the size of the first body portion.

According to certain embodiments, when a first control signal is received through the first communication circuitry 390 from the controller (e.g., controller 220 of FIG. 2) that contacts with a second body portion (e.g., a right hand), the first processor 320 may identify a second graphic object corresponding to the position of the second body portion (e.g., the right hand) at least partially on the basis of the first control signal, may identify a second body graphic object corresponding to the size of the second body portion (e.g., the right hand), and may display the second graphic object gripped by the second body graphic object through the display 360.

According to various embodiments, the second control signal may include information (e.g., grip pattern information) indicating the second body portion with which the controller (e.g., controller 220 of FIG. 2) contacts and the size of the second body portion.

The first processor 320 may identify a specific body portion (e.g., a left hand or a right hand) with which the controller (e.g., controller 220 of FIG. 2) contacts, at least partially on the basis of the control signal received from the controller that contacts with the specific body portion, and may display a graphic object corresponding to the specific body portion through the display 360 (e.g., the display 160 of FIG. 1 and the display 211 of FIG. 2).

Figure 8:
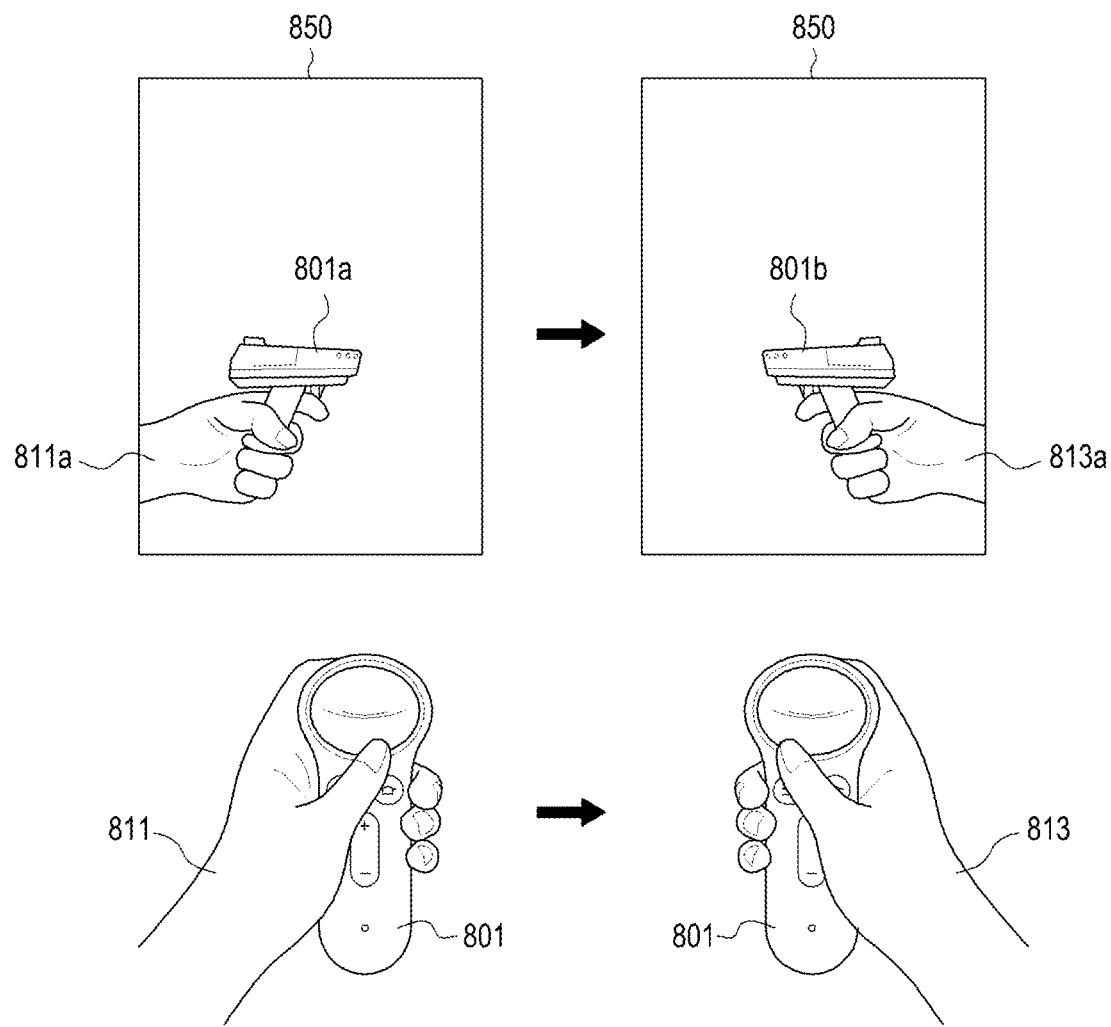
FIG. 8 illustrates aspects of controlling objects displayed in an electronic device according to various embodiments.

According to some embodiments, when a first control signal is received through the first communication circuitry 390 from the controller (e.g., controller 220 of FIG. 2) that contacts with a first body portion (e.g., a left hand), the first processor 320 may display a first graphic object corresponding to the first body portion through the display 360 at least partially on the basis of the first control signal, and the first graphic object may be a first body graphic object (e.g., first body graphic object 811*a* of FIG. 8 or first body graphic object 913*a* of FIG. 9).

According to certain embodiments, the first processor 320 may display a third graphic object (e.g., first graphic object 801*a* of FIG. 8 or second graphic object 801*b* of FIG. 8, a controller graphic object) corresponding to the controller associated with the first graphic object on the basis of the first control signal (e.g., movement information) while displaying a first graphic object (e.g., the first body graphic object {left hand}) indicating the first body portion.

According to various embodiments, the first control signal may include information (e.g., grip pattern information on the basis of sensor data) indicating the first body portion that contacts with the controller (e.g., controller 220 of FIG. 2). According to various embodiments, the first control signal may include information for displaying the first graphic object on the display 360.

According to some embodiments, when a second control signal is received through the first communication circuitry 390 from the controller that contacts with a second body portion (e.g., a right hand), the first processor 320 may display a second graphic object to correspond to the second body portion through the display 360, at least partially on the basis of the second control signal, and the second graphic object may be a second body graphic object (e.g., second body graphic object 813*a* of FIG. 8 or second body graphic object 913*b* of FIG. 9).

According to certain embodiments, the first processor 320 may display the third graphic object corresponding to the controller associated with the second graphic object on the basis of the second control signal (e.g., movement information) while displaying a second graphic object (e.g., a second body graphic object {right hand}) indicating the second body portion. According to various embodiments, the second control signal may include information (e.g., grip pattern information) indicating the second body portion that contacts with the controller (e.g., controller 220 of FIG. 2). According to various embodiments, the first control signal may include information for displaying the first graphic object on the display 360.

The memory 330 (e.g., the memory 130 of FIG. 1) may store a program capable of controlling the electronic device 301, and may store data for providing a virtual space image displayed through the display 360 and data for displaying a virtual graphic object.

The virtual space control module 350 may be controlled by the first processor 320, may generate virtual space data corresponding to content, and may provide a virtual space image through the display 360. The virtual space control module 350 may generate and arrange a target object to be arranged in the virtual space, and may generate and display a virtual graphic object capable of operating the target object.

According to some embodiments, the virtual space control module 350 may generate and display a virtual graphic object corresponding to the controller (e.g., controller 220 of FIG. 2) at the central region of the display 360, under the control of the first processor 320. The virtual space control module 350 may generate and display a first graphic object indicating the controller whose position is changed to a position corresponding to the first body portion, under the control of the first processor 320. The virtual space control module 350 may generate and display a second graphic object indicating the controller whose position is changed to a position corresponding to a second body portion, under the control of the first processor 320. The virtual space control module 350 may generate and display the first graphic object indicating the controller whose position is changed to the position corresponding to the first body portion and the second graphic object indicating the controller whose position is changed to the position corresponding to the second body portion, under the control of the first processor 320.

For example, when content related to a shooting game is provided in a virtual space image under the control of the first processor 320, the virtual space control module 350 may generate and display a virtual space image for the shooting game, and may generate and display a graphic object (e.g., a gun) corresponding to the controller at the central position of the display 360 and a body graphic object (e.g., a hand) gripping the graphic object. The virtual space control module 350 may generate and display a first graphic object (e.g., a gun) corresponding to the position of a first body portion (e.g., a left hand) gripped by a first body graphic object (e.g., a left hand) under the control of the first processor 320, and may change and display the first graphic object on the basis of movement information of the controller.

The virtual space control module 350 may generate and display a second graphic object (e.g., a gun) corresponding to the position of a second body portion (e.g., a right hand) gripped by a second body graphic object (e.g., a right hand) under the control of the first processor 320, and may change and display the second graphic object on the basis of movement information of the controller. The virtual space control module 350 may generate and display a third graphic object (e.g., a gun) corresponding to the position of the first body portion (e.g., the left hand) and the position of the second body portion (e.g., the right hand), which are simultaneously gripped by the first body graphic object (e.g., the left hand) and the second body graphic object (e.g., the right hand) under the control of the first processor 320, and may change and display the third graphic object on the basis of the movement information of the controller.

The first communication circuitry 390 (e.g., communication module 190 of FIG. 1) may include a wired communication module and a wireless communication module and may perform wired communication or wireless communication with the controller (e.g., controller 220 of FIG. 2).

According to certain embodiments, the first communication circuitry 390 may be connected to a second communication circuitry of the controller (e.g., controller 220 of FIG. 2) to transmit and receive data and signals to and from the second communication circuitry of the controller.

According to various embodiments, when signals indicating that the power of the controller is turned on, that is, first to third signals, are received from the second communication circuitry of the controller (e.g., controller 220 of FIG. 2), the first communication circuitry 390 may transmit the received signals to the first processor 320.

Figure 4:
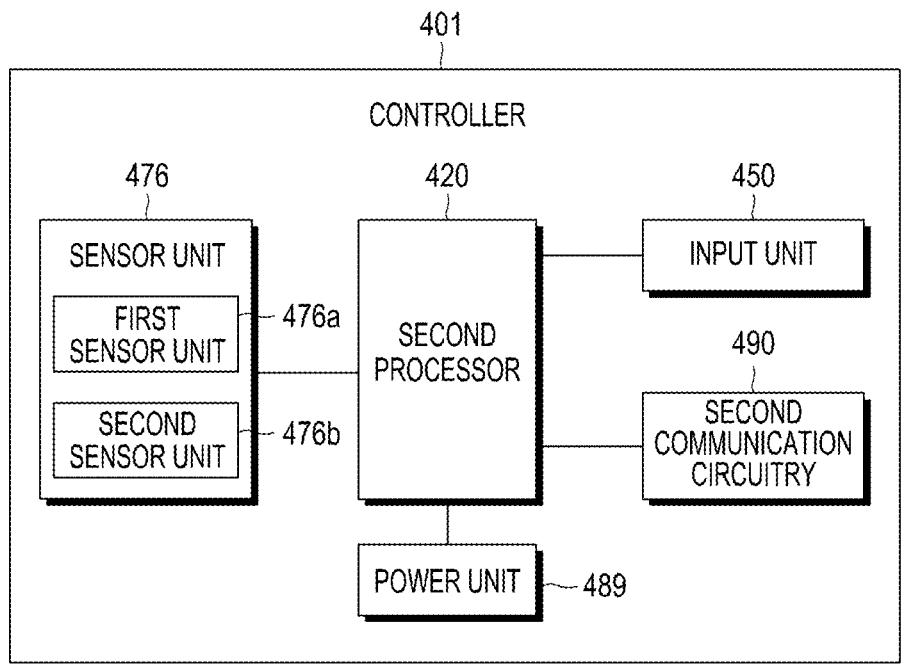
FIG. 4 illustrates a configuration of a controller according to various embodiments.

FIG. 4 illustrates a configuration of a controller according to various embodiments.

Referring to the non-limiting example of FIG. 4, a controller 401 (e.g., the electronic device 102 of FIG. 1) may include a second processor 420, an input unit 450, a sensor unit 476, a power unit 489, and a second communication circuitry 490.

The second processor 420 may obtain a control signal including position information of the controller 401 that contacts with a specific body portion on the basis of a signal (e.g., a control signal) received from the sensor unit 476, and may transmit the obtained control signal to an electronic device (e.g., electronic device 101 of FIG. 1, electronic device 210 of FIG. 2, or electronic device 301 of FIG. 3) through the second communication circuitry 490 (e.g., communication module 190 of FIG. 1). According to some embodiments, the control signal received from the sensor unit 476 may include a signal (e.g., grip pattern information) received from a first sensor unit 476a and movement information (e.g., sensor data) received from a second sensor unit 476b.

According to certain embodiments, the second processor 420 may obtain first grip pattern information on the basis of a grip signal received from the first sensor unit 476a, and may transmit, to an electronic device (e.g., electronic device 210 of FIG. 2), a first control signal indicating that the controller 401 contacts with a first body portion (e.g., a left hand) through the second communication circuitry 490 on the basis of the first grip pattern information.

According to various embodiments, the second processor 420 may obtain second grip pattern information on the basis of the grip signal received from the first sensor unit 476a, and may transmit, to the electronic device (e.g., electronic device 210 of FIG. 2), a second control signal indicating that the controller 401 contacts with a second body portion (e.g., a right hand) through the second communication circuitry 490 on the basis of the second grip pattern information.

According to some embodiments, the second processor 420 may obtain the first grip pattern information and the second grip pattern information on the basis of the grip signal received from the first sensor unit 476a, and may transmit, to the electronic device (e.g., electronic device 210 of FIG. 2), a third control signal indicating that the controller 401 simultaneously contacts with the first body portion (e.g., the left hand) and the second body portion (e.g., the right hand) through the second communication circuitry 490 on the basis of the first grip pattern information and the second grip pattern information.

The input unit 450 (e.g., input device 150 of FIG. 1) may be used to receive inputs associated with a virtual space image and a virtual graphic object displayed through a display of an electronic device and may include a first input unit and a second input unit. The first input unit may include a touch recognition pattern, and the second input unit may include a home key, a back key, and volume keys as a dome key structure.

The sensor unit 476 (e.g., sensor module 176 of FIG. 1) may include the first sensor unit 476a and the second sensor unit 476b, and may transmit a signal obtained by detecting a body that contacts with the controller 401 and a movement signal obtained by movement/rotation of the controller 401 to the second processor 420. The first sensor unit 476a may include at least one first sensor, and may transmit a signal obtained by detecting a specific body portion that contacts with the controller 401 through the at least one first sensor, to the second processor 420. Alternatively, the first sensor unit 476a may transmit the signal obtained by detecting the body that contacts with the controller 401 through the at least one first sensor to the second processor 420, so that the specific body portion that contacts with the controller 401 may be identified by the second processor 420.

The first sensor unit 476a may include at least one sensor, and the at least one sensor may be arranged in a row of the controller 401 or in a specific form thereof. The first sensor unit 476a may detect a gripping state (a left-handed grip or a right-handed grip) with respect to the controller 401 and may include a grip sensor, a touch sensor, a heat sensor, a proximity sensor, and the like.

The sensor unit 476b may detect a change in the movement of the controller 401 and may include an angular velocity sensor, a geomagnetic sensor, an acceleration sensor, and the like. The second sensor unit 476b may be composed of an IC mounted inside a housing of the controller 401.

The power unit 489 (e.g., battery 189 of FIG. 1) may be a device for supplying power to at least one component of the controller 401, and may include, for example, a non-rechargeable primary cell, or a rechargeable secondary cell or fuel cell.

The second communication circuitry 490 (e.g., communication module 190 of FIG. 1) may include a wired communication circuitry and a wireless communication circuitry, and may perform wired communication or wireless communication with the electronic device (e.g., electronic device 210 of FIG. 2).

According to certain embodiments, the second communication circuitry 490 may be connected to a first communication circuitry of the electronic device (e.g., electronic device 210 of FIG. 2) in order to transmit and receive data or signals to and from the first communication circuitry of the electronic device (e.g., electronic device 210 of FIG. 2).

According to various embodiments, the second communication circuitry 490 may transmit signals indicating that the power of the controller 401 is turned on, that is, first to third control signals to the first communication circuitry of the electronic device (e.g., electronic device 210 of FIG. 2).

Figure 5A:
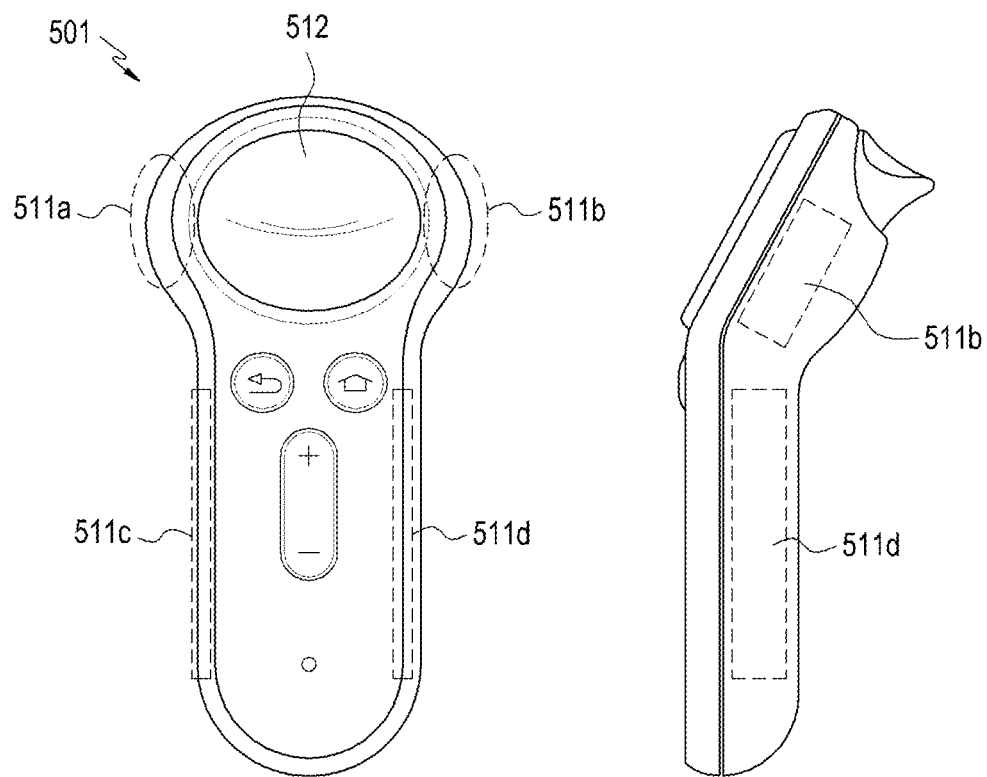
FIGS. 5A and 5B and FIGS. 6 to 7 illustrate arrangements of components of a sensor unit of a controller according to various embodiments.

FIGS. 5A and 5B and FIGS. 6 to 7 illustrate arrangements of components of a sensor unit of a controller according to various embodiments The non-limiting example of FIG. 5A illustrates a front view and a side view of a controller 501 (e.g., the electronic device 102 of FIG. 1) in which at least one sensor 511a to 511d for recognizing a user's grip is arranged. The at least one sensor 511a to 511d for recognizing user's gripping position and gripping state (e.g., the shape of a finger joint of a user in gripping) may be arranged n the controller 501, and may be arranged around a first input unit 512 or/and on the left and right sides of the controller 501.

Figure 5B:
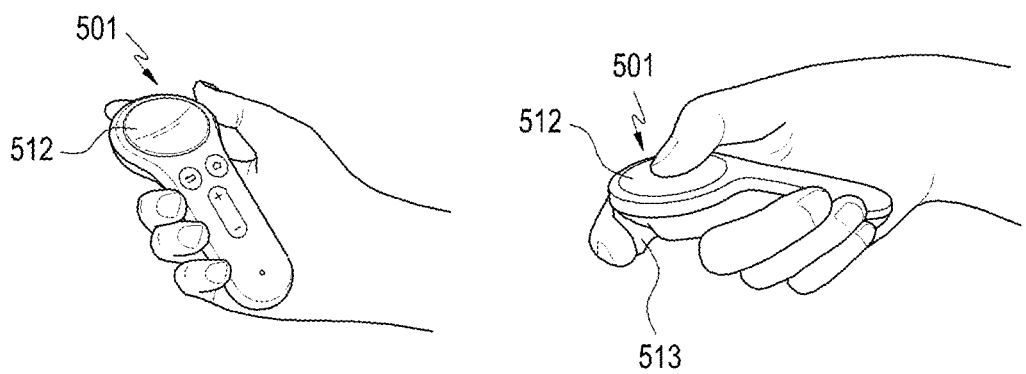

For example, as shown in the non-limiting example of FIG. 5B, when a user uses the controller 501 (e.g., the electronic device 102 of FIG. 1) with their right hand, the first input unit 512 of the controller 501 may be executed, or a thumb of the user gripping a right side surface of the first input unit 512 may be detected through the at least one sensor 511a to 511b. In addition, another input unit 513 positioned on the rear surface of the first input unit 512 of the controller 501 may be executed, or an index finger of the user gripping the upper surface of the first input unit 512 and the rear surface of the upper side thereof may be detected through the at least one sensor 511a to 511b. In addition, the remaining fingers of the user gripping the left side surface of the main body portion of the controller 501 may be detected through the at least one sensor 511a to 511d.

Figure 6:
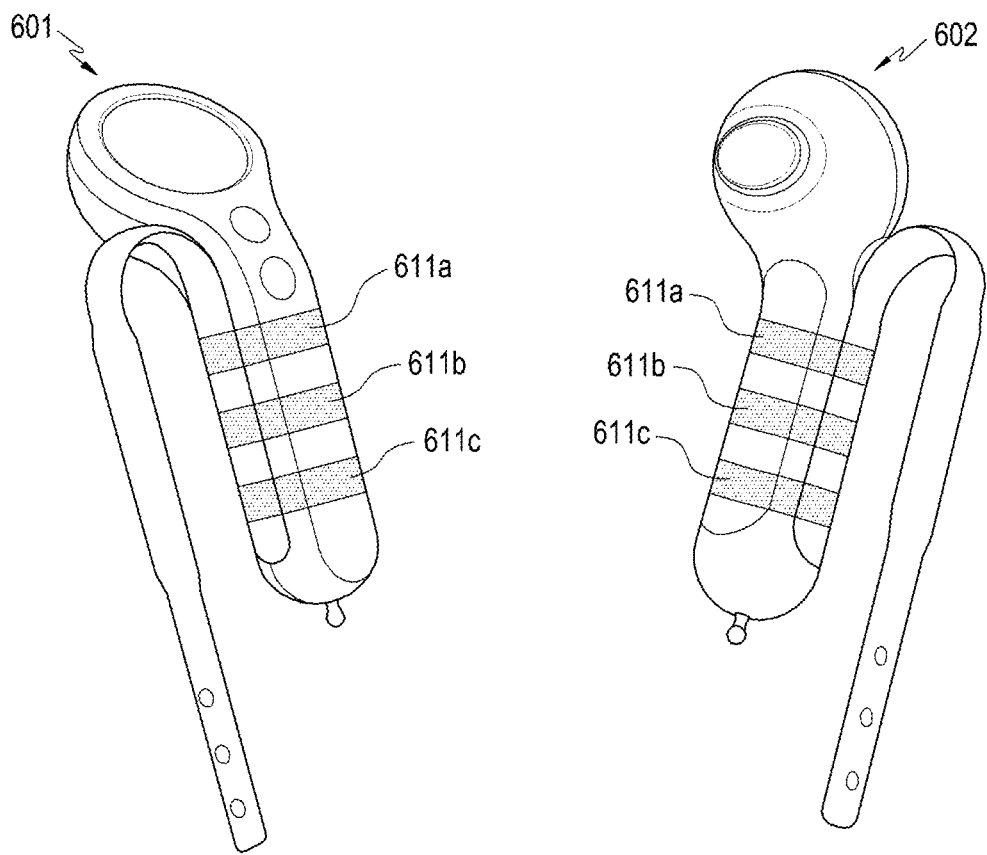

As shown in the non-limiting example of FIG. 6, in various embodiments according to this disclosure, each of at least one sensor 611a to 611c may be arranged in the controller 601 in three rows in the transverse direction.

Figure 7:
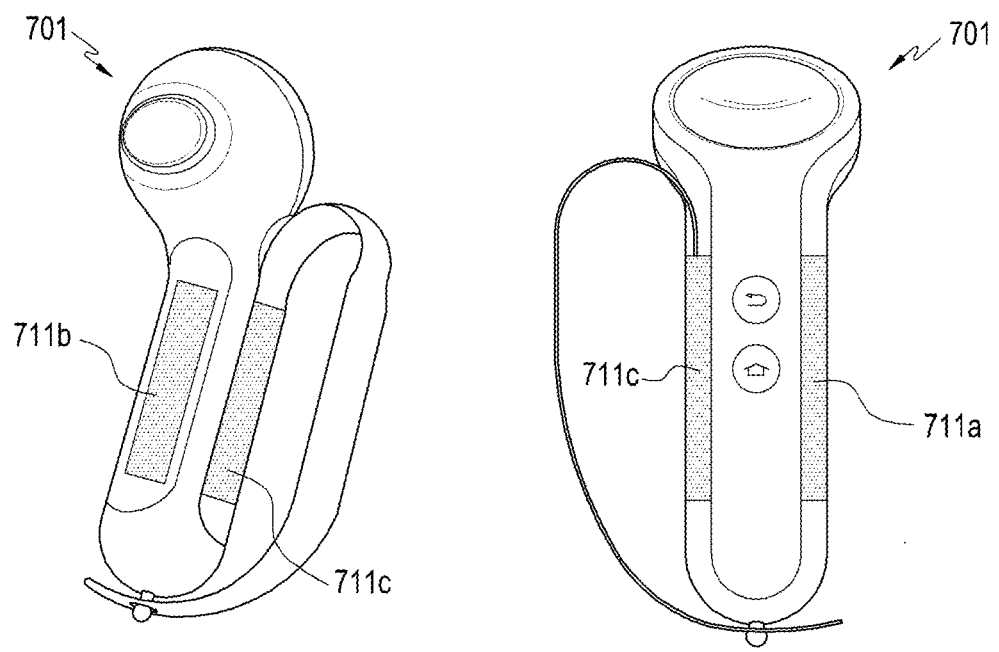

As shown in the illustrative example of FIG. 7, in certain embodiments, each of at least one sensor 711a to 711c may be arranged in the controller 701 in three rows in the longitudinal direction.

FIG. 8 illustrates aspects controlling objects displayed in an electronic device according to various embodiments.

As shown in the illustrative example of FIG. 8, while a user grips a controller 801 (e.g., the electronic device 102 of FIG. 1) with his/her left hand 811, an electronic device (e.g., electronic device 210 of FIG. 2 or electronic device 301 of FIG. 3) may provide virtual image data showing that a first body graphic object 811a corresponding to the left hand 811 grips a first graphic object 801a corresponding to the controller 801 through a display 850.

When a user moves the controller 801 from their left hand 811 to their right hand 813 and grips the moved controller 801, the electronic device (e.g., electronic device 210 of FIG. 2 or electronic device 301 of FIG. 3) may provide virtual image data showing that a second body graphic object 813a corresponding to the right hand 813 grips a second graphic object 801b corresponding to the controller 801 through the display 850 without any specific operation or menu selection.

The controller 801 may detect the movement of the controller 801 from the left hand to the right hand through a sensor unit (e.g., sensor unit 476 of FIG. 4) of the controller 801, and may detect a change in the gripping state or gripping position with respect to the controller 801.

The controller 801 may calculate a change in the position of the controller 801 from the left hand to the right hand through the sensor unit (e.g., the sensor unit 476 of FIG. 4) of the controller 801, and the electronic device (e.g., the electronic device 210 of FIG. 2 or the electronic device 301 of FIG. 3) may change and display the first graphic object 801a corresponding to the controller 801 to a second graphic object 801b through the display 850 when the change in the position of the controller 801 is identified.

Figure 9A:
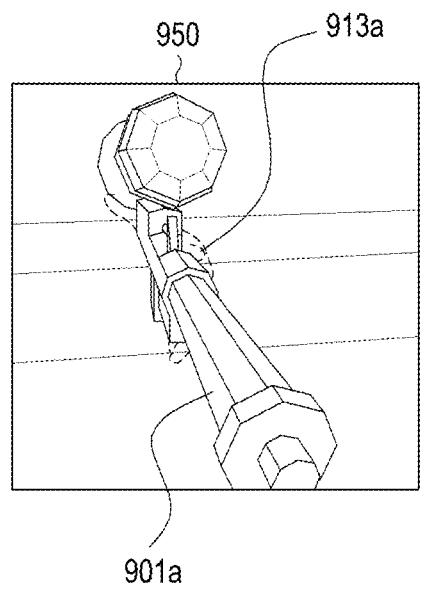
FIGS. 9A and 9B illustrate aspects of controlling objects displayed in an electronic device according to various embodiments.
Figure 9B:
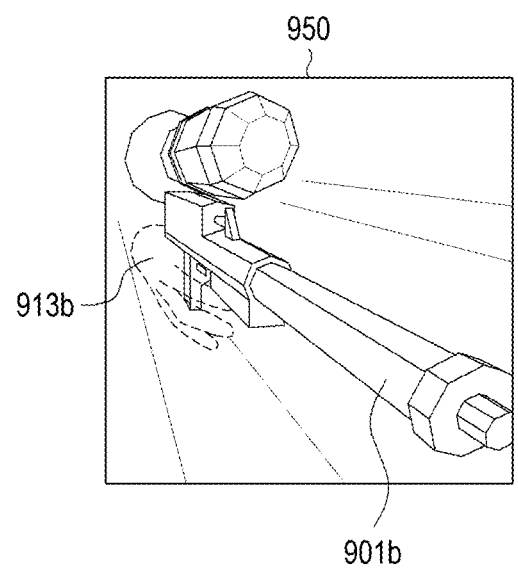

FIGS. 9A and 9B illustrate aspects of controlling objects displayed in an electronic device according to various embodiments.

In the non-limiting example of FIG. 9A, an electronic device (e.g., the electronic device 101 of FIG. 1, the electronic device 210 of FIG. 2, or the electronic device 301 of FIG. 3) may display a controller graphic object 901a or 901b corresponding to a controller (e.g., the electronic device 102 of FIG. 1, the controller 220 of FIG. 2, or the controller 401 of FIG. 4) and a first graphic object (e.g., a first body graphic object 913a) corresponding to the left hand of a gripping user, on a display 950 of the electronic device. Alternatively, the electronic device (e.g., the electronic device 101 of FIG. 1, the electronic device 210 of FIG. 2, or the electronic device 301 of FIG. 3) may display a second graphic object (e.g., a second body graphic object 913b) corresponding to the right hand of the user on the display 950 of the electronic device. The first graphic object or the second graphic object may be rendered at a position corresponding to a region of the controller graphic object and displayed on the display 950 of the electronic device. The electronic device may display, on the display 950 of the electronic device, the first body graphic object 913a and the controller graphic object 901a, which are rendered in an adjusted state by reflecting specific state values, such as the position, rotation, and size of the controller, in a virtual reality.

According to some embodiments, when the electronic device recognizes that the user has moved the controller to their right hand, which is not currently gripping the controller and the second body graphic object 913b (e.g., a second body graphic object) corresponding to the right hand of the user may be rendered and displayed at the same position as the position of the first body graphic object 913a (e.g., a first body graphic object) of FIG. 9A, the naturalness of a graphic object provided in a virtual space image may be deprived. Accordingly, as shown in FIG. 9B, the second graphic object 901b corresponding to the right hand of the user may be rendered and displayed at the position of a controller graphic object 901a or 901b corresponding to the controller according to the gripping movement, and the state value of the second graphic object 901b which is gripped in the virtual reality may be adjusted, so that the naturalness of the second graphic object 901b may be maintained.

Figure 10A:
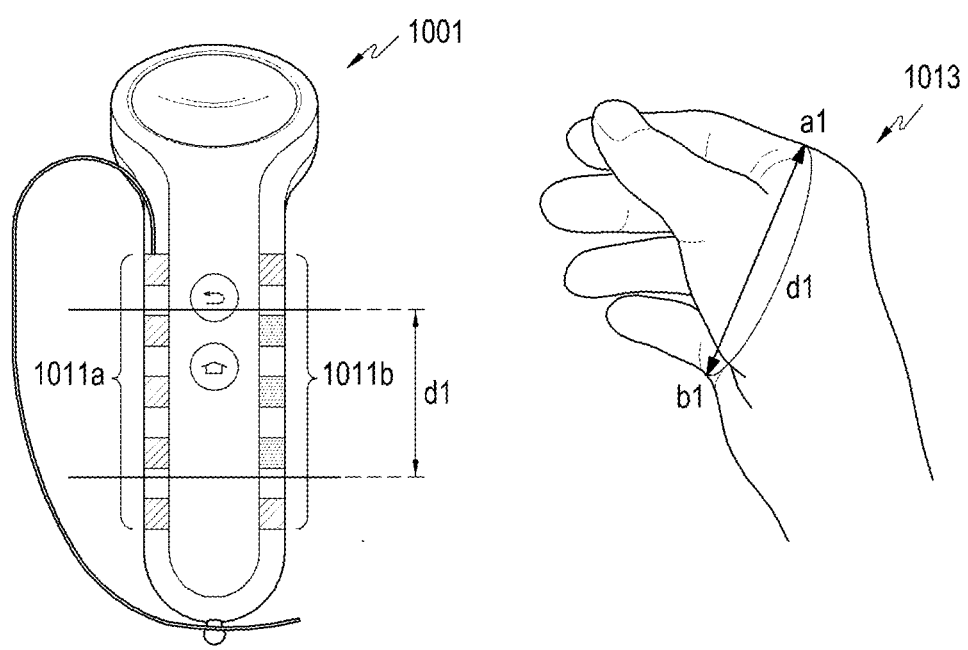
FIGS. 10A and 10B illustrate aspects of identifying the size of an object in an electronic device according to various embodiments.
Figure 10B:
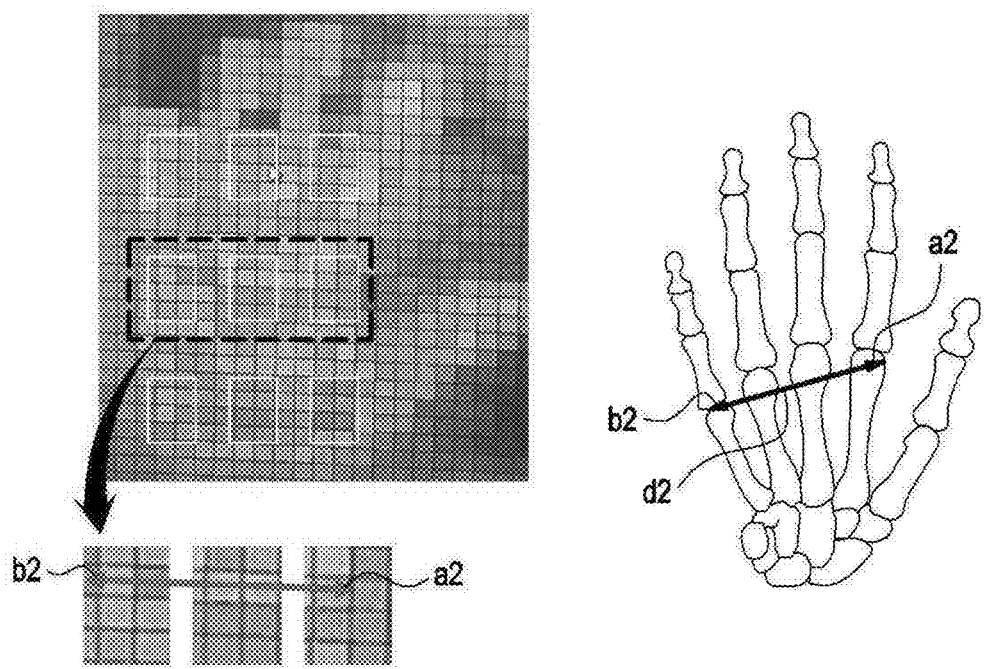

FIGS. 10A and 10B illustrate aspects of identifying the size of an object in an electronic device according to various embodiments.

Referring to the non-limiting example of FIG. 10A, at least one proximity sensor may be arranged in a row or in a specific form of patterns in a controller 1001 (e.g., the controller 220 of FIG. 2 or the controller 401 of FIG. 4). Values of proximity sensors of M lines composed of N sets may constitute a matrix composed of N rows and M columns. For example, when proximity sensors 1011a and 1011b are constituted by two lines composed of five sets, sensor values may be represented by values of a matrix such as [[0, 1, 1, 1, 0], [0, 0, 0, 0, 0]]. The values of the matrix may be included in a control signal as grip pattern information to be transmitted to an electronic device (e.g., the electronic device 101 of FIG. 1, the electronic device 210 of FIG. 2, or the electronic device 301 of FIG. 3), and the electronic device may detect a specific body portion (e.g., a left hand and/or a right hand) gripped by the controller on the basis of the values of the matrix included in the control signal. In addition, the electronic device may detect a distance d1 from the outside a1 of an index finger to the outside b1 of a little finger on the basis of the values of the matrix, and may identify the detected distance d1 to be the size/width of a user's hand gripping the controller. The electronic device may adjust and display a body graphic object to be displayed on a virtual space image through the display to correspond to the identified size/width of the user's hand.

Referring to the illustrative example of FIG. 10B, at least one grip sensor may be arranged in a row or in a specific form of patterns in the controller 1001 (e.g., controller 220 of FIG. 2 or controller 401 of FIG. 4). When the grip sensors are arranged in a 3×3 form in the controller, values of outlines a2 and b2 may be detected from the sensor value in the second column.

The detected values of the outlines may be included as the grip pattern information in the control signal to be transmitted to the electronic device (e.g., electronic device 101 of FIG. 1, electronic device 210 of FIG. 2, or electronic device 301 of FIG. 3), and the electronic device may detect a distance d2 from a joint a2 between the metacarpal bone and the proximal phalanx of the index finger of the hand gripping the controller to a joint b2 between the metacarpal bone and the proximal phalanx of the little finger thereof on the basis of the values of the outlines included in the control signal. The electronic device may identify the detected distance d2 to be the size/width of the user's hand gripping the controller. The electronic device may adjust and display a body graphic object to be displayed in a virtual space image through the display to correspond to the identified size/width of the user's hand.

According to various embodiments, an electronic device may include a display (e.g., the display 360 of FIG. 3), a communication circuitry (e.g., the first communication circuitry 390 of FIG. 3), and a processor (e.g., the processor 120 of FIG. 1 or the processor 320 of FIG. 3). The processor may be configured to acquire, through the communication circuitry, a first control signal from a controller contacting with a first body portion, the first control signal including information indicating that the controller contacts with the first body portion, display a first graphic object corresponding to the first body portion through the display, at least partially on the basis of the first control signal, acquire, through the communication circuitry, a second control signal from the controller contacting with a second body portion, the second control signal including information indicating that the controller contacts with the second body portion, and display a second graphic object corresponding to the second body portion through the display, at least partially on the basis of the second control signal.

According to various embodiments, the processor (e.g., the processor 120 of FIG. 1 or the processor 320 of FIG. 3) may be configured to display a graphic object corresponding to the controller in at least a partial region of the display when a power on signal of the controller is acquired through the communication circuitry, display the first graphic object associated with the graphic object when first position information of the controller contacting with the first body portion is identified at least partially on the basis of the first control signal, and display the second graphic object associated with the graphic object when second position information of the controller contacting with the second body portion is identified at least partially on the basis of the second control signal.

According to various embodiments, the processor (for example, the processor 120 of FIG. 1 or the processor 320 of FIG. 3) may be configured to change and display the first graphic object to correspond to movement of the controller when information associated with the movement of the controller is identified at least partially on the basis of the first control signal, and change and display the second graphic object to correspond to the movement of the controller when information associated with the movement of the controller is identified at least partially on the basis of the second control signal.

According to various embodiments, the processor (e.g., the processor 120 of FIG. 1 or the processor 320 of FIG. 3) may be configured to acquire, through the communication circuitry, a third control signal from the controller contacting with the first body portion and the second body portion, the third control signal including information indicating that the controller contacts with the first body portion and the second body portion, and display the first graphic object corresponding to the first body portion and the second graphic object corresponding to the second body portion through the display, at least partially on the basis of the third control signal.

According to various embodiments, the processor (e.g., the processor 120 of FIG. 1 or the processor 320 of FIG. 3) may be configured to identify a first size of the first body portion with which the controller contacts at least partially on the basis of the first control signal; to change and display the size of a first body graphic object contacting with the first graphic object at least partially on the basis of the first size, to identify a second size of the second body portion with which the controller contacts at least partially on the basis of the second control signal; and to change and display the size of a second body graphic object contacting with the second graphic object at least partially on the basis of the second size.

According to various embodiments, the first graphic object may indicate the first body graphic object obtained at least partially on the basis of the first control signal, and the second graphic object may indicate the second body graphic object obtained at least partially on the basis of the second control signal.

According to various embodiments, the first control signal includes first grip pattern information corresponding to the first body portion detected by a first sensor unit of the controller and information associated with the movement of the controller detected by a second sensor unit of the controller, and the second control signal includes second grip pattern information corresponding to the second body portion detected by the first sensor unit of the controller and information associated with the movement of the controller detected by the second sensor unit of the controller.

According to various embodiments, the processor (e.g., the processor 120 of FIG. 1 or the processor 320 of FIG. 3) may be configured to display a virtual space image through the display, display a graphic object corresponding to the controller and the first graphic object corresponding to the first body portion on the virtual space image, and display the graphic object corresponding to the controller and the second graphic object corresponding to the second body portion on the virtual space image.

According to various embodiments, the electronic device may include a head mount display device.

According to various embodiments, an electronic device may include a sensor unit (e.g., sensor unit 476 of FIG. 4), a communication circuitry (e.g., second communication circuitry 490 of FIG. 4), and a processor (e.g., processor 420 of FIG. 4). The processor may be configured to acquire a first control signal from the sensor unit on the basis of the electronic device that contacts with a first body portion, transmit the first control signal to another electronic device through the communication circuitry so that the other electronic device displays a first graphic object corresponding to the first body portion on the basis of the first control signal, acquire a second control signal from the sensor unit on the basis of the electronic device that contacts with a second body portion, and transmit the second control signal to the other electronic device through the communication circuitry so that the other electronic device displays a second graphic object corresponding to the second body portion on the basis of the second control signal.

According to various embodiments, the sensor unit (e.g., sensor unit 476 of FIG. 4) may include a first sensor unit configured to detect a body portion that contacts with the electronic device and a second sensor unit configured to detect a signal associated with movement of the electronic device.

According to various embodiments, the processor (e.g., processor 420 of FIG. 4) may be configured to obtain the first control signal including information indicating that the controller contacts with the first body portion on the basis of a signal received from the sensor unit, and obtain the second control signal including information indicating that the controller contacts with a second body portion on the basis of a signal received from the sensor unit.

According to various embodiments, the first control signal may include first grip pattern information corresponding to the first body portion detected by the first sensor unit of the electronic device and information associated with the movement of the electronic device detected by the second sensor unit of the electronic device, and the second control signal may include second grip pattern information corresponding to the second body portion detected by the first sensor unit of the electronic device and information associated with the movement of the electronic device detected by the second sensor unit of the electronic device.

Figure 11:
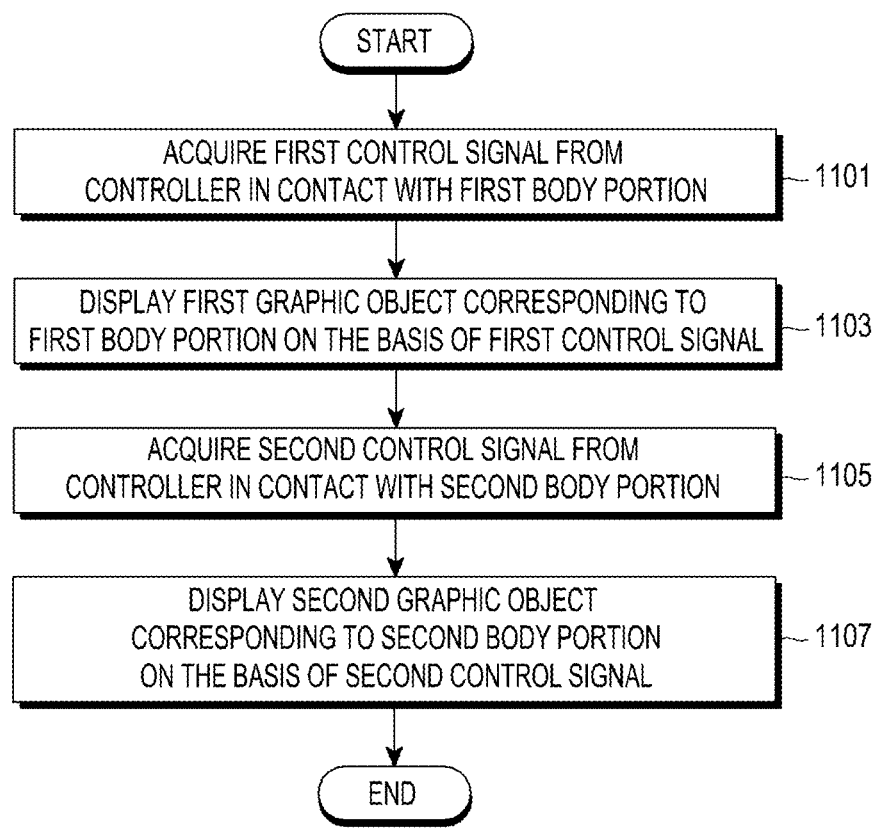
FIG. 11 illustrates, in flowchart format, operations of a method of controlling objects displayed in an electronic device according to various embodiments.

FIG. 11 illustrates, in flowchart format, operations of a method of controlling objects displayed in an electronic device according to various embodiments. According to some embodiments, an object display method may include operation 1101 through operation 1107. The object display method may be performed by at least one of an electronic device (e.g., electronic device 101 of FIG. 1, electronic device 210 of FIG. 2, or the electronic device 301 of FIG. 3) and at least one processor (e.g., processor 120 of FIG. 1 or processor 320 of FIG. 3) of the electronic device.

In operation 1101, an electronic device (e.g., processor 120 of FIG. 1 or processor 320 of FIG. 3) may acquire, from the controller, a first control signal indicating that a controller (e.g., controller 220 of FIG. 2 or controller 401 of FIG. 4) contacts with a first body portion.

According to certain embodiments, the first control signal may include grip pattern information indicating a first body portion detected by a sensor unit of the controller. For example, the first control signal may include grip pattern information indicating that the controller is gripped by a user's left hand.

In operation 1103, the electronic device (e.g., processor 120 of FIG. 1 or processor 320 of FIG. 3) may display a first graphic object corresponding to the first body portion on the basis of the first control signal through a display (e.g., display 360 of FIG. 3) of the electronic device.

According to various embodiments, the electronic device (e.g., processor 320 of FIG. 3) may display a first graphic object for a left hand (e.g., a controller graphic object) corresponding to the controller at the position of the user's left hand gripping the controller through the display (e.g., display 360 of FIG. 3) on the basis of the first control signal, and may display a first body graphic object corresponding to the user's left hand at a position corresponding to a region of the first graphic object (e.g., the graphic object associated with the controller).

According to some embodiments, the electronic device (for example, processor 320 of FIG. 3) may display the first graphic object (e.g., the first body graphic object) corresponding to the user's left hand gripping the controller through the display (e.g., display 360 of FIG. 3) on the basis of the first control signal, and may display a third graphic object (e.g., a controller graphic object) corresponding to the controller associated with the first graphic object at a position corresponding to the region of the first graphic object (e.g., the first body graphic object).

In operation 1105, the electronic device (e.g., processor 120 of FIG. 1 or the processor 320 of FIG. 3) may acquire a second control signal indicating that a controller (e.g., controller 220 of FIG. 2 or controller 401 of FIG. 4) contacts with a second body portion, from the controller.

According to certain embodiments, the second control signal may include grip pattern information indicating a second body portion detected by the sensor unit of the controller. For example, the second control signal may include grip pattern information indicating that the controller is gripped by a user's right hand.

In operation 1107, the electronic device (e.g., processor 120 of FIG. 1 or processor 320 of FIG. 3) may display a second graphic object corresponding to the second body portion through the display (e.g., display 360 of FIG. 3) of the electronic device on the basis of the second control signal.

According to various embodiments, the electronic device (e.g., processor 120 of FIG. 1 or processor 320 of FIG. 3) may display a second graphic object for a right hand (e.g., a controller graphic object) corresponding to the controller at the position of the user's right hand gripping the controller through the display (e.g., display 360 of FIG. 3) on the basis of the second control signal, and may display a second body graphic object corresponding to the user's right hand at a position corresponding to a region of the second graphic object (e.g., the controller graphic object).

According to some embodiments, the electronic device (for example, processor 120 of FIG. 1 or processor 320 of FIG. 3) may display the second graphic object (e.g., the second body graphic object) corresponding to the user's right hand gripping the controller through the display (e.g., display 360 of FIG. 3) on the basis of the second control signal, and may display the third graphic object (e.g., the controller graphic object) corresponding to the controller associated with the second graphic object at a position corresponding to the region of the second graphic object (e.g., the second body graphic object).

Figure 12:
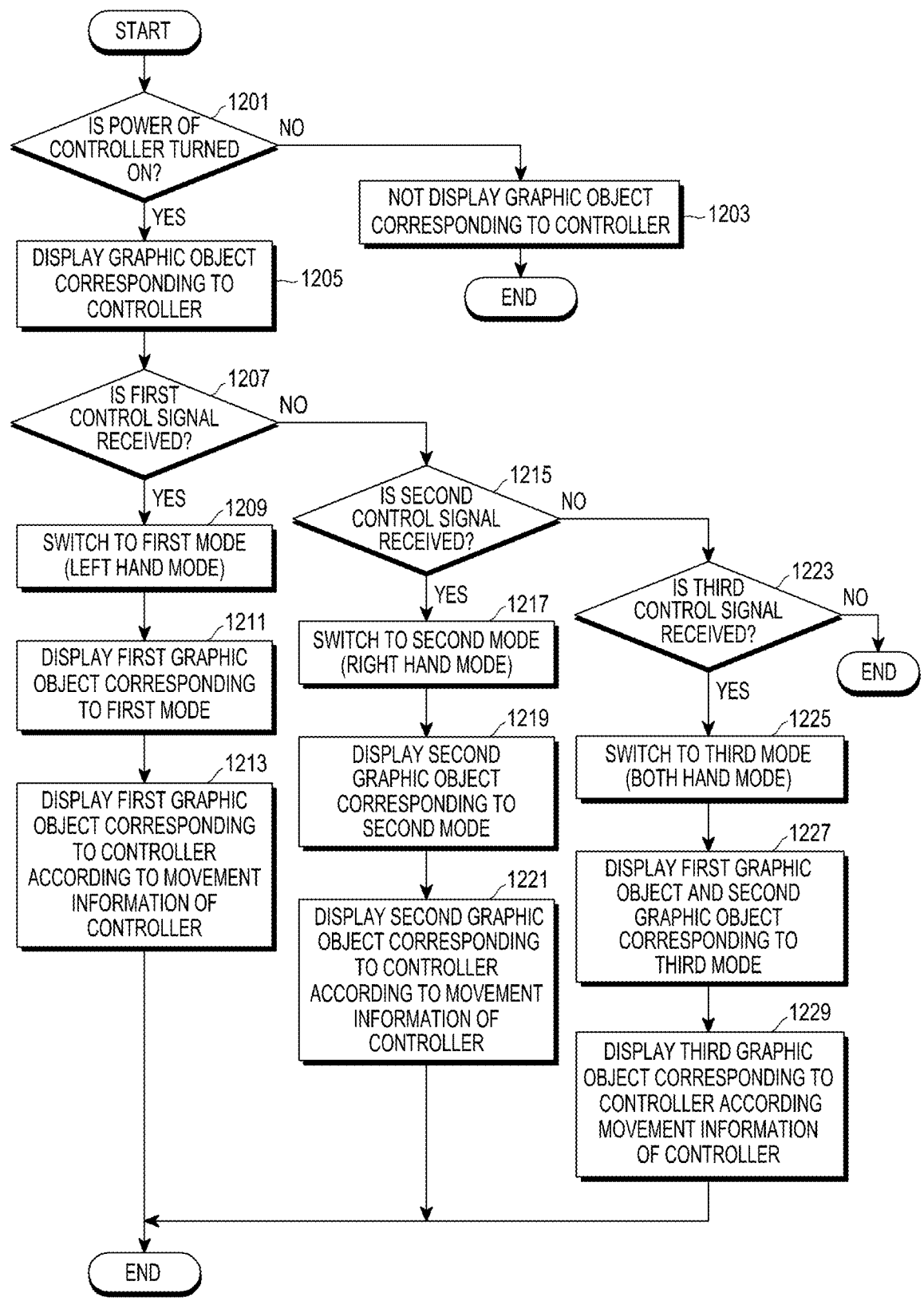
FIG. 12 illustrates, in flowchart format, operations of a method of controlling objects displayed in an electronic device according to various embodiments.

FIG. 12 illustrates in flowchart format, operations of a method of controlling objects displayed in an electronic device according to various embodiments. According to various embodiments, the method includes operations 1201 through 1229. The method may, in some embodiments, be performed by at least one of an electronic device (e.g., the electronic device 101 of FIG. 1, the electronic device 210 of FIG. 2, or the electronic device 301 of FIG. 3) and at least one processor (e.g., the processor 120 of FIG. 1 or the processor 320 of FIG. 3) of the electronic device.

In operation 1201, an electronic device (e.g., processor 120 of FIG. 1 or processor 320 of FIG. 3) may wait for the reception of a signal indicating that the power of a controller (e.g., controller 220 of FIG. 2 or controller 401 of FIG. 4) is turned on, from the controller through a communication circuitry (e.g., first communication circuitry 390 of FIG. 3).

In operation 1203, when the signal indicating that the power of the controller is turned on is not received from the controller in operation 1201, the electronic device (e.g., processor 120 of FIG. 1 or processor 320 of FIG. 3) may not display a graphic object corresponding to the controller on a display (e.g., display 360 of FIG. 3), or may display a graphic object indicating that the controller is deactivated or change and display transparency of the graphic object corresponding to the controller.

In operation 1205, when the signal indicating that the power of the controller is turned on is received from the controller in operation 1201, the electronic device (e.g., processor 120 of FIG. 1 or processor 320 of FIG. 3) may display the graphic object corresponding to the controller at a central region of the display (e.g., display 360 of FIG. 3).

In operation 1207, the electronic device (e.g., processor 120 of FIG. 1 or the processor 320 of FIG. 3) may receive a first control signal from the controller (e.g., controller 220 of FIG. 2 or controller 401 of FIG. 4) through the communication circuitry (e.g., first communication circuitry 390 of FIG. 3).

In operation 1209, the electronic device (e.g., the processor 120 of FIG. 1 or the processor 320 of FIG. 3) may switch the display mode of a graphic object to a first mode (e.g., a left hand mode) on the display, on the basis of first grip pattern information indicating a first body portion (e.g., a left hand) included in the first control signal.

In operation 1211, the electronic device (e.g., processor 120 of FIG. 1 or processor 320 of FIG. 3) may display a first graphic objet corresponding to the first mode (e.g., the left hand mode) on the display (e.g., display 360 of FIG. 3) on the basis of the first control signal.

According to certain embodiments, the electronic device (e.g., processor 120 of FIG. 1 or processor 320 of FIG. 3) may change the graphic object corresponding to the controller to the first graphic object corresponding to the first mode (e.g., the left hand mode) to display the changed graphic object on the display (e.g., display 360 of FIG. 3), on the basis of the first control signal. At this time, the electronic device may display the first graphic object gripped by a first body graphic object (e.g., a left hand) corresponding to the first mode, through the display (e.g., display 360 of FIG. 3).

According to various embodiments, the electronic device (e.g., processor 120 of FIG. 1 or processor 320 of FIG. 3) may display the first graphic object (e.g., the first body graphic object) corresponding to the first body portion (e.g., the left hand) through the display (e.g., display 360 of FIG. 3), on the basis of the first control signal. At this time, the electronic device may display a third graphic object (e.g., a controller graphic object for the first mode) corresponding to the controller associated with the first graphic object at a position corresponding to a region of the first graphic object (e.g., the first body graphic object).

In operation 1213, the electronic device (e.g., processor 120 of FIG. 1 or processor 320 of FIG. 3) may change and display the first graphic object (e.g., the first graphic object or the controller graphic object for the first mode corresponding to the controller) so as to correspond to movement information of the controller included in the first control signal.

According to some embodiments, the electronic device (e.g., processor 120 of FIG. 1 or processor 320 of FIG. 3) may periodically receive the first control signal including the first grip pattern information indicating the first body portion and the movement information of the controller, from the controller.

According to certain embodiments, the electronic device (e.g., processor 120 of FIG. 1 or processor 320 of FIG. 3) may receive the first control signal including only the movement information of the controller until there is a change in grip with respect to the controller, after receiving the first control signal including the first grip pattern information indicating the first body portion and the movement information of the controller, from the controller.

In operation 1215, the electronic device (e.g., processor 120 of FIG. 1 or processor 320 of FIG. 3) may receive a second control signal from the controller (e.g., controller 220 of FIG. 2 or controller 401 of FIG. 4) through the communication circuitry (e.g., first communication circuitry 390 of FIG. 3).

In operation 1217, the electronic device (e.g., processor 120 of FIG. 1 or processor 320 of FIG. 3) may switch the display mode of the graphic object to a second mode (e.g., a right hand mode) on the display, on the basis of second grip pattern information indicating a second body portion (e.g., a right hand) included in the second control signal.

In operation 1219, the electronic device (e.g., processor 120 of FIG. 1 or processor 320 of FIG. 3) may display a second graphic object corresponding to the second mode (e.g., the right hand mode) on the display (e.g., display 360 of FIG. 3) on the basis of the second control signal. According to various embodiments, the electronic device (e.g., the processor 120 of FIG. 1 or the processor 320 of FIG. 3) may change the graphic object corresponding to the controller to the second graphic object corresponding to the second mode (e.g., the right hand mode) to display the changed graphic object on the display (e.g., display 360 of FIG. 3), on the basis of the second control signal. At this time, the electronic device may display the second graphic object gripped by the second body graphic object (e.g., the right hand) corresponding to the second mode through the display (e.g., display 360 of FIG. 3).

According to some embodiments, the electronic device (e.g., processor 120 of FIG. 1 or processor 320 of FIG. 3) may display the second graphic object (e.g., the second body graphic object) corresponding to the second body portion (e.g., the right hand) through the display (e.g., display 360 of FIG. 3) on the basis of the second control signal. At this time, the electronic device (e.g., processor 120 of FIG. 1 or processor 320 of FIG. 3) may display a third graphic object (e.g., a controller graphic object for a second mode) corresponding to the controller associated with the second graphic object at a position corresponding to a region of the second graphic object (e.g., the second body graphic object) and may display the changed graphic object.

In operation 1221, the electronic device (e.g., processor 120 of FIG. 1 or processor 320 of FIG. 3) may change and display the second graphic object (e.g., the second graphic object corresponding to the controller or the controller graphic object for the second mode) so as to correspond to movement information of the controller included in the second control signal.

According to certain embodiments, the electronic device (e.g., processor 120 of FIG. 1 or processor 320 of FIG. 3) may periodically receive the first control signal including the second grip pattern information indicating the second body portion and the movement information of the controller, from the controller.

According to various embodiments, the electronic device (e.g., processor 120 of FIG. 1 or processor 320 of FIG. 3) may receive the second control signal including only the movement information of the controller until there is a change in grip with respect to the controller, after receiving the second control signal including the second grip pattern information indicating the second body portion and the movement information of the controller, from the controller.

In operation 1223, the electronic device (e.g., processor 120 of FIG. 1 or processor 320 of FIG. 3) may receive a third control signal from the controller (e.g., electronic device 210 of FIG. 2 or controller 401 of FIG. 4) through the communication circuitry (e.g., first communication circuitry 390 of FIG. 3).

In operation 1225, the electronic device (e.g., processor 120 of FIG. 1 or processor 320 of FIG. 3) may switch the display mode of the graphic object to a third mode (e.g., both hand mode) on the display, on the basis of the first grip pattern information indicating the first body portion (e.g., the left hand) and the second grip pattern information indicating the second body portion (e.g., the right hand) included in the third control signal.

In operation 1227, the electronic device (e.g., processor 120 of FIG. 1 or processor 320 of FIG. 3) may display a third graphic object corresponding to the third mode (e.g., the both hand mode) through the display (e.g., display 360 of FIG. 3), on the basis of the third control signal.

According to some embodiments, the electronic device (e.g., processor 120 of FIG. 1 or processor 320 of FIG. 3) may change the graphic object corresponding to the controller to a third graphic object corresponding to the first mode (e.g., the left hand mode) and may display the changed graphic object on the display (e.g., display 360 of FIG. 3), on the basis of the third control signal. At this time, the electronic device may display the third graphic object simultaneously gripped by the first body graphic object (e.g., the left hand) and the second body graphic object (e.g., the right hand) corresponding to the third mode, through the display (e.g., display 360 of FIG. 3).

According to certain embodiments, the electronic device (e.g., processor 120 of FIG. 1 or processor 320 of FIG. 3) may display the first graphic object (e.g., the first body graphic object) corresponding to the first body portion (e.g., the left hand) and the second graphic object (e.g., the second body graphic object) corresponding to the second body portion (e.g., the right hand) through the display (e.g., display 360 of FIG. 3), on the basis of the third control signal. At this time, the electronic device (e.g., processor 120 of FIG. 1 or processor 320 of FIG. 3) may display the third graphic object (e.g., the controller graphic object for a third mode) corresponding to the controller associated with the first graphic object and the second graphic object at positions corresponding to the region of the first graphic object (e.g., the first body graphic object) and the region of the second graphic object (e.g., the second body graphic object).

In operation 1229, the electronic device (e.g., processor 120 of FIG. 1 or processor 320 of FIG. 3) may change and display the third graphic object (e.g., the third graphic object corresponding to the controller or the controller graphic object for the third mode) so as to correspond to the movement information of the controller included in the third control signal.

According to various embodiments, the electronic device (e.g., processor 120 of FIG. 1 or processor 320 of FIG. 3) may periodically receive the third control signal including the first grip pattern information indicating the first body portion, the second grip pattern information indicating the second body portion, and the movement information of the controller, from the controller.

According to some embodiments, the electronic device (e.g., processor 120 of FIG. 1 or processor 320 of FIG. 3) may receive the third control signal including only the movement information of the controller until there is a change in grip with respect to the controller, after receiving the third control signal including the first grip pattern information indicating the first body portion, the second grip pattern information indicating the second body portion, and the movement information of the controller, from the controller.

Figure 13:
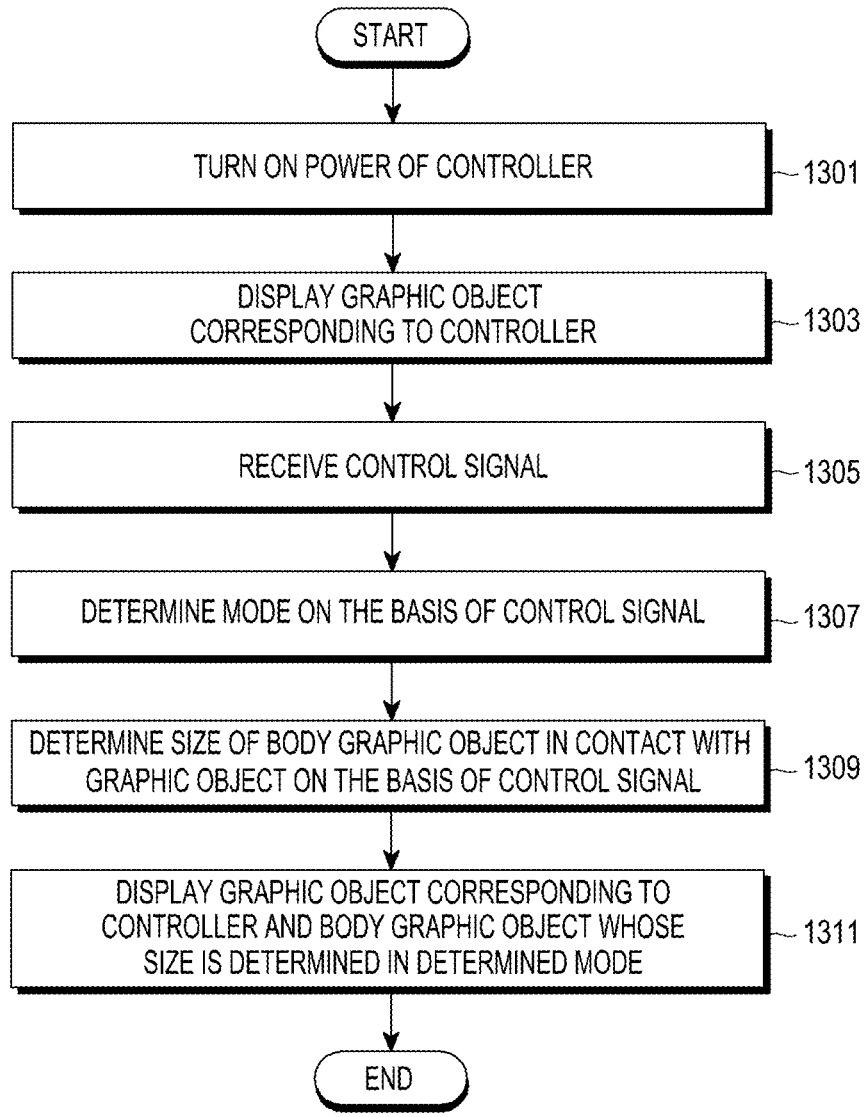
FIG. 13 illustrates, in flowchart format, operations of a method of controlling objects displayed in an electronic device according to various embodiments.

FIG. 13 illustrates, in flowchart format, operations a method of controlling objects displayed in an electronic device according to various embodiments. According to certain embodiments, the method may include operations 1301 through 1311. The method may, in some embodiments, be performed by at least one of an electronic device (e.g., electronic device 101 of FIG. 1, electronic device 210 of FIG. 2, or electronic device 301 of FIG. 3) and at least one processor (e.g., processor 120 of FIG. 1 or processor 320 of FIG. 3) of the electronic device.

In operation 1301, an electronic device (e.g., processor 120 of FIG. 1 or processor 320 of FIG. 3) may receive a signal indicating that the power of a controller (e.g., controller 220 of FIG. 2 or controller 401 of FIG. 4) is turned on from a communication circuitry (e.g., first communication circuitry 390).

In operation 1303, the electronic device (e.g., processor 120 of FIG. 1 or processor 320 of FIG. 3) may display a graphic object corresponding to the controller through a display (e.g., display 360 of FIG. 3) of the electronic device.

In operation 1305, the electronic device (e.g., processor 120 of FIG. 1 or processor 320 of FIG. 3) may receive a control signal from the controller (e.g., controller 220 of FIG. 2 or controller 401 of FIG. 4) through a circuitry (e.g., the first communication circuitry 390).

In operation 1307, the electronic device (e.g., processor 120 of FIG. 1 or processor 320 of FIG. 3) may identify which body portion grips the controller on the basis of the control signal, and may identify a mode capable of displaying an object corresponding to the controller.

For example, when the control signal is a first control signal including first grip pattern information indicating whether a first body portion grips the controller, the display mode of a graphic object may be identified to be a first mode (e.g., a left hand mode) on a display on the basis of the first grip pattern information indicating the first body portion (e.g., the left hand) included in the first control signal.

For example, when the control signal is a second control signal including second grip pattern information indicating whether a second body portion grips the controller, the display mode of the graphic object may be identified to be a second mode (e.g., a right hand mode) on the display on the basis of the second grip pattern information indicating the second body portion (e.g., the right hand) included in the second control signal.

For example, when the control signal is a third control signal including first grip pattern information and second grip pattern information indicating whether the first body portion and the second body portion grip the controller, the display mode of the graphic object may be identified to be a third mode (e.g., a both hand mode) on the display on the basis of the first grip pattern information indicating the first body portion (e.g., the left hand) and the second grip pattern information indicating the second body portion (e.g., the right hand) included in the third control signal.

In operation 1309, the electronic device (e.g., processor 120 of FIG. 1 or processor 320 of FIG. 3) may identify the size of a body graphic object that contacts with the graphic object corresponding to the controller on the basis of the control signal. In operation 1309, the electronic device may identify the size of a specific body portion (e.g., a hand) on the basis of grip pattern information indicating whether the specific body portion grips the controller, which is included in the control signal, and may identify the size of the body graphic object corresponding to the specific body portion (e.g., the hand).

In operation 1311, the electronic device (e.g., processor 120 of FIG. 1 or processor 320 of FIG. 3) may display virtual image data indicating that the body graphic object corresponding to the specific body portion (e.g., the hand) in which the size is identified in the identified mode (e.g., a first mode (a left hand mode), a second mode (a right hand mode), or a third mode (a both hand mode) grips the graphic object corresponding to the controller, through a display (e.g., display 360 of FIG. 3).

Figure 14:
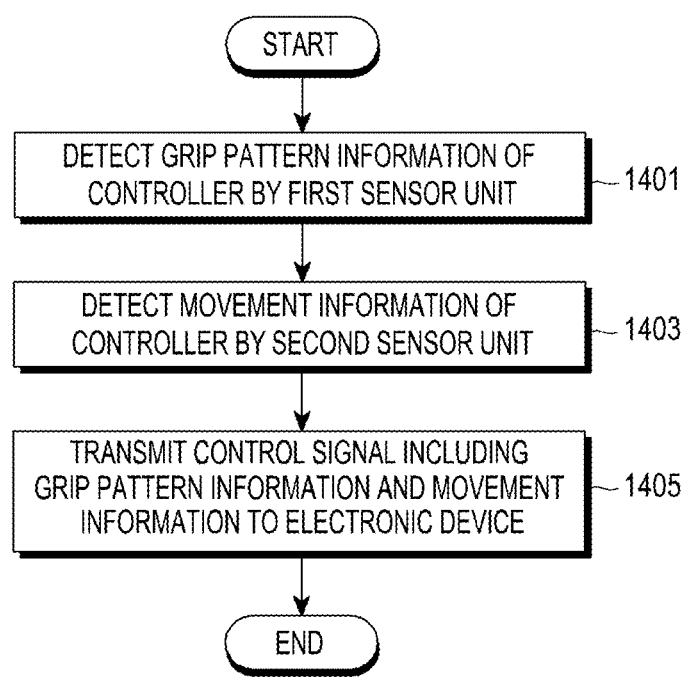
FIG. 14 illustrates, in flowchart format, operations of a method of transmitting a control signal in a controller according to various embodiments.

FIG. 14 illustrates, in flowchart format, operations of a method of transmitting a control signal in a controller according to various embodiments. The method of transmitting a control signal may, in some embodiments, include operations 1401 through 1405. The method of illustrated with reference to FIG. 14 may, in various embodiments, be performed by at least one controller (e.g., controller 220 of FIG. 2 or controller 401 of FIG. 4) and at least one processor (e.g., processor 420 of FIG. 4) of the controller.

In operation 1401, a controller (e.g., the processor 420 of FIG. 4) may detect grip pattern information indicating a specific body portion gripped by the controller on the basis of a sensor value received from a first sensor unit (e.g., first sensor unit 476a of FIG. 4).

According to certain embodiments, the controller (e.g., processor 420 of FIG. 4) may detect first grip pattern information indicating that a first body portion (e.g., a left hand) grips the controller or second grip pattern information indicating that a second body portion (e.g., a right hand) grips the controller, on the basis of the sensor value.

According to various embodiments, the controller (e.g., processor 420 of FIG. 4) may identify a mode according to the body portion gripping the controller on the basis of the detected grip pattern information. For example, the controller may identify the mode according to the body portion to be a first mode (e.g., a left hand mode) when the detected grip pattern information is first grip pattern information indicating the first body portion, may identify the mode according to the body portion to be a second mode (e.g., a right hand mode) when the detected grip pattern information is second grip pattern information indicating the second body portion, and may identify the mode according to the body portion to be a third mode (e.g., a both hand mode) when the detected grip pattern information is third grip pattern information simultaneously indicating the first body portion and the second body portion.

In operation 1403, the controller (e.g., processor 420 of FIG. 4) may detect movement/rotation information of the controller on the basis of a sensor value received from a second sensor unit (e.g., second sensor unit 476b of FIG. 4).

According to some embodiments, the controller (e.g., processor 420 of FIG. 4) may detect the movement/rotation information of the controller on the basis of the sensor value received from the second sensor unit (e.g., second sensor unit 476b of FIG. 4), in the first mode indicating the first body portion (e.g., the left hand) gripping the controller.

According to certain embodiments, the controller (e.g., processor 420 of FIG. 4) may detect the movement/rotation information of the controller on the basis of the sensor value received from the second sensor unit (e.g., second sensor unit 476b of FIG. 4), in the second mode indicating the second body portion (e.g., the right hand) gripping the controller.

According to various embodiments, the controller (e.g., processor 420 of FIG. 4) may detect the movement/rotation information of the controller on the basis of the sensor value received from the second sensor unit (e.g., second sensor unit 476b of FIG. 4), in the third mode indicating the first body portion (e.g., the left hand) and the second body portion (e.g., the right hand) which grip the controller.

In operation 1405, the controller (e.g., processor 420 of FIG. 4) may transmit a control signal including the grip pattern information or the movement information of the controller to an electronic device (e.g., electronic device 210 of FIG. 2 or electronic device 301 of FIG. 3) through a communication circuitry (e.g., second communication circuitry 490 of FIG. 4).

According to some embodiments, the controller (e.g., processor 420 of FIG. 4) may transmit, to the electronic device, a first control signal including only the movement information of the controller until the first mode is changed to another mode after transmitting a first control signal including first grip pattern information indicating that the controller is gripped by the first body portion to the electronic device, in the first mode indicating the first body portion (e.g., the left hand) gripping the controller.

According to certain embodiments, the controller (e.g., processor 420 of FIG. 4) may transmit, to the electronic device, the first control signal including only the movement information of the controller until the first mode is changed to another mode, after transmitting the first control signal including the first grip pattern information indicating that the controller is gripped by the first body portion and the movement information of the controller to the electronic device, in the first mode indicating the first body portion (e.g., the left hand) gripping the controller.

According to various embodiments, the controller (e.g., processor 420 of FIG. 4) may transmit, to the electronic device, a second control signal including only the movement information of the controller until the second mode is changed to another mode, after transmitting a second control signal including second grip pattern information indicating that the controller is gripped by a second body portion (e.g., a right hand) to the electronic device, in the second mode indicating the second body portion (e.g., the right hand) gripping the controller.

According to some embodiments, the controller (e.g., processor 420 of FIG. 4) may transmit, to the electronic device, the second control signal including only the movement information of the controller until the second mode is changed to another mode, after the second control signal including the second grip pattern information indicating that the controller is gripped by the second body portion and the movement information of the controller to the electronic device, in the second mode indicating the second body portion (e.g., the right hand) gripping the controller.

According to certain embodiments, the controller (e.g., processor 420 of FIG. 4) may transmit, to the electronic device, a third control signal including only the movement information of the controller until the third mode is changed to another mode, after transmitting a third control signal including third grip pattern information indicating that the controller is gripped by the first body portion and the second body portion, in the third mode indicating the first body portion (e.g., the left hand) and the second body portion (e.g., the right hand) gripping the controller.

According to various embodiments, the controller (e.g., processor 420 of FIG. 4) may transmit, to the electronic device, the third control signal including only the movement information of the controller until the third mode is changed to another mode, after transmitting the third control signal including the third grip pattern information indicating that the controller is gripped by the first body portion and the second body portion and the movement information of the controller to the electronic device, in the third mode indicating the first body portion (e.g., the left hand) and the second body portion (e.g., the right hand) which grip the controller.

According to various embodiments, a method of controlling object display in an electronic device may comprise acquiring, through a communication circuitry included in the electronic device, a first control signal including information indicating that a controller contacts with a first body portion from the controller that contacts with the first body portion, displaying, through a display, a first graphic object corresponding to the first body portion and a third graphic object corresponding to the controller associated with the first graphic object, at least partially on the basis of the first control signal, acquiring, through the communication circuitry, a second control signal including information indicating that the controller contacts with a second body portion from the controller that contacts with the second body portion, and displaying, through the display, a second graphic object corresponding to the second body portion and the third graphic object associated with the second graphic object, at least partially on the basis of the second control signal.

According to various embodiments, the method of controlling object display may further comprise displaying the third graphic object corresponding to the controller in at least a partial region of the display when a signal indicating that the power of the controller is turned on is acquired from the communication circuitry, displaying the first graphic object and the third graphic object associated with the first graphic object when first position information of the controller that contacts with the first body portion is identified at least partially on the basis of the first control signal, and displaying the second graphic object and the third graphic object associated with the second graphic object when second position information of the controller that contacts with the second body portion is identified at least partially on the basis of the second control signal.

According to various embodiments, the method of controlling object display may further comprise changing and displaying the third graphic object to correspond to the movement of the controller when information associated with the movement of the controller is identified at least partially on the basis of the first control signal, and changing and displaying the third graphic object to correspond to the movement of the controller when information associated with the movement of the controller is identified at least partially on the basis of the second control signal.

According to various embodiments, the method of controlling object display may further comprise acquiring, through the communication circuitry, a third control signal including information indicating that the controller contacts with the first body portion and the second body portion from the controller that contacts with the first body portion and the second body portion, and displaying the first graphic object corresponding to the first body portion, the second graphic object corresponding to the second body portion, and the third graphic object corresponding to the controller associated with the first graphic object and the second graphic object, through the display at least partially on the basis of the third control signal.

According to various embodiments, the method of controlling object display may further comprise identifying the first size of the first body portion with which the controller contacts at least partially on the basis of the first control signal and changing and displaying the size of the first graphic object at least partially on the basis of the first size, and identifying the second size of the second body portion with which the controller contacts at least partially on the basis of the second control signal and changing and displaying the size of the second graphic object at least partially on the basis of the second size.

According to various embodiments, the first control signal includes first grip pattern information corresponding to the first body portion detected by a first sensor unit of the controller and information associated with movement of the controller detected by a second sensor unit of the controller, and the second control signal includes second grip pattern information corresponding to the second body portion detected by the first sensor unit of the controller and information associated with the movement of the controller detected by the second sensor unit of the controller.

According to various embodiments, the method of controlling object display may further comprise displaying a virtual space image through the display, displaying the first graphic object corresponding to the first body portion and the third graphic object corresponding to the controller associated with the first graphic object in the virtual space image, and displaying the second graphic object corresponding to the second body portion and the third graphic object corresponding to the controller associated with the second graphic object in the virtual space image.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Array (FPGA), or a programmable-logic device, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. Instructions may include a code generated by a compiler or a code that can be executed by an interpreter.

According to various embodiments, in a storage medium storing the instructions, the instructions may be configured to cause, when executed by at least one processor, the at least one processor to perform at least one operation, in which the at least one operation includes an operation of acquiring a first control signal including information indicating that a controller contacts with a first body portion from the controller contacting with the first body portion through a communication module included in the electronic device; an operation of displaying a first graphic object corresponding to the first body portion and a third graphic object corresponding to the controller associated with the first graphic object through a display, at least partially on the basis of the first control signal; an operation of acquiring a second control signal including information indicating that the controller contacts with a second body portion from the controller contacting with the second body portion through the communication module; and an operation of displaying a second graphic object corresponding to the second body portion and the third graphic object associated with the second graphic object through the display, at least partially on the basis of the second control signal.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a display;
    a communication circuitry; and
    a processor,
    wherein the processor is configured to:
        acquire, through the communication circuitry, a first control signal from a controller contacting with a first body portion, the first control signal including information indicating that the controller contacts with the first body portion,
        display, based on the first control signal, a first graphic object corresponding to the first body portion through the display,
        when the controller contacting with the first body portion is moved to a second body portion, acquire, through the communication circuitry, a second control signal from the controller contacting with the second body portion, the second control signal including information indicating that the controller contacts with the second body portion, and
        display, based on the second control signal, a second graphic object corresponding to the second body portion through the display.

2. The electronic device of claim 1, wherein the processor is configured to:
    display a graphic object corresponding to the controller in at least a partial region of the display when a power on signal of the controller is acquired through the communication circuitry,
    display the first graphic object as being associated with the graphic object corresponding to the controller, when first position information indicates the controller is in contact with the first body portion, the first position information based on the first control signal, and
    display the second graphic object as being associated with the graphic object to the controller, when second position information indicates the controller is in contact with the second body portion, the second position information based on the second control signal.

3. The electronic device of claim 1, wherein the processor is configured to:
    display the first graphic object in response to information associated with movement of the controller, wherein the information associated with movement of the controller is based on the first control signal, and
    display the second graphic object in response to information associated with movement, wherein the information associated with movement of the controller is based on the second control signal.

4. The electronic device of claim 1, wherein the processor is configured to:
    acquire, through the communication circuitry, a third control signal from the controller in contact with the first body portion and the second body portion, the third control signal including information indicating that the controller is in contact with the first body portion and the second body portion, and
    display the first graphic object corresponding to the first body portion and the second graphic object corresponding to the second body portion through the display, based on the third control signal.

5. The electronic device of claim 1, wherein the processor is configured to:
    identify, based on the first control signal, a first size of the first body portion in contact with the controller,
    display a first body graphic object based on the identified first size, identify, based on the second control signal, a second size of the second body portion in contact with the controller, and display a second body graphic object based on the identified second size.

6. The electronic device of claim 1, wherein the first graphic object includes a first body graphic object, the first body graphic object obtained based on the first control signal, and the second graphic object includes a second body graphic object, the second body graphic object obtained based on the second control signal.

7. The electronic device of claim 1, wherein
the first control signal includes first grip pattern information corresponding to the first body portion detected by a first sensor unit of the controller and information associated with movement of the controller detected by a second sensor unit of the controller, and
the second control signal includes second grip pattern information corresponding to the second body portion detected by the first sensor unit of the controller and information associated with the movement of the controller detected by the second sensor unit of the controller.

8. The electronic device of claim 1, wherein the processor is configured to:
display a virtual space image through the display,
display a graphic object corresponding to the controller and the first graphic object corresponding to the first body portion on the virtual space image, and
display the graphic object corresponding to the controller and the second graphic object corresponding to the second body portion on the virtual space image.

9. The electronic device of claim 1, wherein the electronic device includes a head mount display device.

10. A method of controlling objects displayed in an electronic device, comprising:
acquiring, through a communication circuitry included in the electronic device, a first control signal including information indicating that a controller is in contact with a first body portion;
displaying, through a display, based on the first control signal, a first graphic object corresponding to the first body portion and a third graphic object corresponding to the controller and associated with the first graphic object;
when the controller contacting with the first body portion is moved to a second body portion, acquiring, through the communication circuitry, a second control signal including information indicating that the controller is in contact with the second body portion; and
displaying, through the display, based on the second control signal, a second graphic object corresponding to the second body portion and the third graphic object corresponding to the controller and associated with the second graphic object.

11. The method of claim 10, further comprising:
displaying the third graphic object corresponding to the controller in at least a partial region of the display when a signal indicating that power of the controller is turned on is acquired from the communication circuitry;
displaying the first graphic object and the third graphic object corresponding to the controller and associated with the first graphic object based on first position information of the controller, the first position information of the controller based on the first control signal; and
displaying the second graphic object and the third graphic object corresponding to the controller and associated with the second graphic object based on second position information of the controller, the second position information of the controller based on the second control signal.

12. The method of claim 10, further comprising:
displaying the third graphic object in response to information associated with movement of the controller, wherein information associated with movement of the controller is based on the first control signal; and
displaying the third graphic object in response to information associated with movement of the controller, wherein the information associated with movement of the controller is based on the second control signal.

13. The method of claim 10, further comprising:
acquiring, through the communication circuitry from the controller, a third control signal including information indicating that the controller is in contact with the first body portion and the second body portion; and
displaying, through the display, the first graphic object corresponding to the first body portion, the second graphic object corresponding to the second body portion, and the third graphic object corresponding to the controller based on the third control signal.

14. The method of claim 10, further comprising:
identifying, based on the first control signal, a first size of the first body portion in contact with the controller;
displaying a first graphic object based on the identified first size;
identifying, based on the second control signal, a second size of the second body portion in contact with the controller; and
displaying a second graphic object based on the identified second size.

15. The method claim 10, wherein
the first control signal includes first grip pattern information corresponding to the first body portion detected by a first sensor unit of the controller and information associated with movement of the controller detected by a second sensor unit of the controller, and
the second control signal includes second grip pattern information corresponding to the second body portion detected by the first sensor unit of the controller and information associated with the movement of the controller detected by the second sensor unit of the controller.

16. The method of claim 10, further comprising:
displaying a virtual space image through the display;
displaying the first graphic object corresponding to the first body portion and the third graphic object corresponding to the controller associated with the first graphic object in the virtual space image; and
displaying the second graphic object corresponding to the second body portion and the third graphic object corresponding to the controller associated with the second graphic object in the virtual space image.

17. An electronic device comprising:
a sensor unit;
a communication circuitry; and
a processor,
wherein the processor is configured to:
acquire a first control signal from the sensor unit based on the electronic device contacting with a first body portion,
transmit the first control signal to another electronic device through the communication circuitry, the first control signal associated with displaying, based on the first control signal, a first graphic object corresponding to the first body portion, when the electronic device contacting with the first body portion is moved to a second body portion, acquire a second control signal from the sensor unit based on the electronic device contacting with a second body portion, and transmit the second control signal to the another electronic device through the communication circuitry, the second control signal associated with displaying, based on the second control signal, a second graphic object corresponding to the second body portion.

18. The electronic device of claim 17, wherein the sensor unit includes a first sensor unit configured to detect a body portion in contact with the electronic device, and a second sensor unit configured to detect a signal associated with movement of the electronic device.

19. The electronic device of claim 17, wherein the processor is configured to:

obtain the first control signal based on a signal received from the sensor unit, the first control signal including information indicating that the controller is in contact with the first body portion, and obtain the second control signal based on a signal received from the sensor unit, the second control signal including information indicating that the controller is in contact with a second body portion.

20. The electronic device of claim 17, wherein the first control signal includes first grip pattern information corresponding to the first body portion detected by a first sensor unit of the electronic device and information associated with movement of the electronic device detected by a second sensor unit of the electronic device, and the second control signal includes second grip pattern information corresponding to the second body portion detected by the first sensor unit of the electronic device and information associated with the movement of the electronic device detected by the second sensor unit of the electronic device.

* * * * *